United States Patent
Xu

(10) Patent No.: US 12,389,047 B2
(45) Date of Patent: Aug. 12, 2025

(54) LIVE STREAM PROCESSING METHOD AND APPARATUS

(71) Applicant: SHANGHAI BILIBILI TECHNOLOGY CO., LTD., Shanghai (CN)

(72) Inventor: Zhen Xu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 13 days.

(21) Appl. No.: 18/241,764

(22) Filed: Sep. 1, 2023

(65) Prior Publication Data

US 2024/0080504 A1    Mar. 7, 2024

(30) Foreign Application Priority Data

Sep. 5, 2022   (CN) .......................... 202211078115.3

(51) Int. Cl.
| | |
|---|---|
| *H04N 21/234* | (2011.01) |
| *G06T 7/20* | (2017.01) |
| *H04N 21/2187* | (2011.01) |
| *H04N 21/25* | (2011.01) |
| *H04N 21/258* | (2011.01) |
| *H04N 21/262* | (2011.01) |
| *H04N 21/418* | (2011.01) |
| *H04N 21/44* | (2011.01) |
| *H04N 21/442* | (2011.01) |

(52) U.S. Cl.
CPC .......... *H04N 21/2187* (2013.01); *G06T 7/20* (2013.01); *H04N 21/262* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2014/0366065 A1* | 12/2014 | Hattori | H04N 21/4751 725/45 |
| 2015/0326945 A1* | 11/2015 | Johnson | H04N 21/472 725/32 |
| 2019/0342620 A1* | 11/2019 | Yan | H04N 21/4312 |

* cited by examiner

*Primary Examiner* — Brian T Pendleton
*Assistant Examiner* — Jean D Saint Cyr
(74) *Attorney, Agent, or Firm* — BakerHostetler

(57) ABSTRACT

The present application provides techniques for generating live streams. The techniques comprise obtaining motion attribute information and a set of virtual scene types associated with a target live streaming room; generating, based on the motion attribute information and each of the set of virtual scene types, a plurality of live streams to be played that correspond to the set of virtual scene types; receiving a live stream viewing request sent from an audience client device, where the live stream viewing request comprises a user attribute identifier; determining a target live stream among the plurality of live streams based on the user attribute identifier; and returning, to the audience client device, the target live stream for display on the audience client device.

17 Claims, 9 Drawing Sheets

Obtain motion attribute information and a virtual scene type set of a target live streaming room — 202

Generate, based on the motion attribute information and each virtual scene type in the virtual scene type set, a live stream to be played that corresponds to the virtual scene type — 204

Receive a live streaming viewing request sent by an audience client, where the live streaming viewing request includes a user attribute identifier — 206

Determine, from all live streams to be played and based on the user attribute identifier, a target live stream to be played that corresponds to the user attribute identifier — 208

Return, to the audience client, the target live stream to be played — 210

LIVE STREAM PROCESSING METHOD AND APPARATUS

CROSS-REFERENCE TO RELATED APPLICATION

The present application claims priority to Chinese Patent Application No. 202211078115.3, filed on Sep. 5, 2023, which is incorporated herein by reference in its entirety.

TECHNICAL FIELD

The present application relates to the field of computer technologies, and in particular, to a live stream processing method. The present application also relates to a live stream processing apparatus, a computing device, and a computer-readable storage medium.

BACKGROUND ART

With the continuous development of live streaming technologies, live streaming forms of a live streaming room are also increasing. Therefore, improvements in livestreaming are needed

SUMMARY OF THE INVENTION

In view of this, embodiments of the present application provide a live stream processing method. The present application also relates to a live stream processing apparatus, a computing device, and a computer-readable storage medium, to resolve a problem in the prior art that live streaming room content cannot meet diversified requirements of users.

According to a first aspect of the embodiments of the present application, there is provided a live stream processing method, applied to a server computing system, and including:
  obtaining motion attribute information and a virtual scene type set of a target live streaming room;
  generating, based on the motion attribute information and each virtual scene type in the virtual scene type set, a live stream to be played that corresponds to the virtual scene type; receiving a live streaming viewing request sent by an audience client, where the live streaming viewing request includes a user attribute identifier;
  determining, from all live streams to be played and based on the user attribute identifier, a target live stream to be played that corresponds to the user attribute identifier; and returning, to the audience client, the target live stream to be played.

According to a second aspect of the embodiments of the present application, there is provided a live stream processing apparatus, applied to a server computing system, and including:
  an obtaining module configured to obtain motion attribute information and a virtual scene type set of a target live streaming room;
  a generation module configured to generate, based on the motion attribute information and each virtual scene type in the virtual scene type set, a live stream to be played that corresponds to the virtual scene type;
  a receiving module configured to receive a live streaming viewing request sent by an audience client, where the live streaming viewing request includes a user attribute identifier;
  a determining module configured to determine, from all live streams to be played and based on the user attribute identifier, a target live stream to be played that corresponds to the user attribute identifier; and
  a return module configured to return, to the audience client, the target live stream to be played.

According to a third aspect of the embodiments of the present application, there is provided a live stream processing method, applied to a streamer client, and including:
  receiving scene configuration information, and generating a virtual scene type set based on the scene configuration information;
  receiving a live streaming start request, and obtaining motion attribute information based on the live streaming start request; and
  sending the motion attribute information and the virtual scene type set to a server computing system, such that the server computing system generates, based on the motion attribute information and the virtual scene type set, a live stream to be played.

According to a fourth aspect of the embodiments of the present application, there is provided a live stream processing apparatus, applied to a streamer client, and including:
  a generation module configured to receive scene configuration information, and generate a virtual scene type set based on the scene configuration information;
  an obtaining module configured to receive a live streaming start request, and obtain motion attribute information based on the live streaming start request; and
  a sending module configured to send the motion attribute information and the virtual scene type set to a server computing system, such that the server computing system generates, based on the motion attribute information and the virtual scene type set, a live stream to be played.

According to a fifth aspect of the embodiments of the present application, there is provided a live stream processing method, applied to an audience client, and including:
  receiving an access request for a target live streaming room;
  obtaining a user attribute identifier of a user in response to the access request, and generating a live streaming viewing request for the target live streaming room based on the user attribute identifier;
  sending the live streaming viewing request to a server computing system, and receiving a target live stream to be played that is returned by the server computing system based on the user attribute identifier, where virtual image attribute information and/or virtual scene information in the target live stream to be played are/is determined based on the user attribute identifier; and
  displaying the target live stream to be played.

According to a sixth aspect of the embodiments of the present application, there is provided a live stream processing apparatus, applied to an audience client, and including:
  a receiving module configured to receive an access request for a target live streaming room;
  a generation module configured to obtain a user attribute identifier of a user in response to the access request, and generate a live streaming viewing request for the target live streaming room based on the user attribute identifier;
  a sending module configured to send the live streaming viewing request to a server computing system, and receive a target live stream to be played that is returned by the server computing system based on the user attribute identifier, where virtual image attribute information and/or virtual scene information in the target live stream to be played are/is determined based on the user attribute identifier; and a display module configured to display the target live stream to be played.

According to a seventh aspect of the embodiments of the present application, there is provided a computing device, including a memory, a processor, and computer instructions stored on the memory and executable on the processor, where the computer instructions, when executed by the processor, implement the steps of the live streaming processing method.

According to an eighth aspect of the embodiments of the present application, there is provided a computer-readable storage medium storing computer instructions, where the computer instructions, when executed by a processor, implement the steps of the live stream processing method.

According to the live stream processing method provided in the present application, the motion attribute information and the virtual scene type set of the target live streaming room are obtained; the live stream to be played that corresponds to each virtual scene type in the virtual scene type set is generated based on the motion attribute information and the virtual scene type; the live streaming viewing request sent by an audience client device is received, where the live streaming viewing request includes the user attribute identifier; the target live stream to be played that corresponds to the user attribute identifier is determined from all the live streams to be played and based on the user attribute identifier; and the target live stream to be played is returned to the audience client.

In one embodiment of the present application, the live stream to be played that corresponds to each virtual scene type is generated based on the motion attribute information and the virtual scene type set, such that different audience clients may display live streams to be played that correspond to the audience clients, thereby enriching live stream content, and improving viewing experience of users.

DETAILED DESCRIPTION OF EMBODIMENTS

Figure 1A:
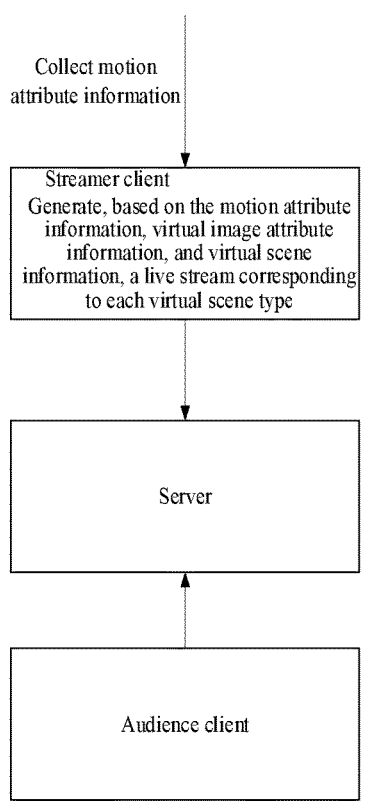
FIGS. 1a, 1b, 1c are data flow diagrams in an architecture of generating live streams according to embodiments of the present application.

In the following description, numerous specific details are set forth to provide a thorough understanding of the present application. However, the present application can be implemented in numerous other ways different from those described herein, and those skilled in the art can make similar extensions without departing from the essence of the present application. Therefore, the present application is not limited by the specific implementations disclosed below.

Terms used in one or more embodiments of the present application are merely for the purpose of describing specific embodiments, and are not intended to limit one or more embodiments of the present application. The terms "a/an", "said", and "the" in the singular form used in one or more embodiments of the present application and the appended claims are also intended to include the plural form, unless otherwise clearly indicated in the context. It should also be understood that, the term "and/or" used in one or more embodiments of the present application indicates and includes any or all possible combinations of one or more associated listed items.

It should be understood that although the terms "first", "second", etc. may be used in one or more embodiments of the present application to describe various information, the information should not be limited to these terms. These terms are merely used to distinguish the same type of information from one another. For example, without departing from the scope of one or more embodiments of the present application, "first" may also be referred to as "second", and similarly, "second" may also be referred to as "first". Depending on the context, the word "if" as used herein may be interpreted as "when" or "upon" or "in response to determining".

First, the terms used in one or more embodiments of the present application are explained.

A virtual scene is a digital scene outlined by a computer by using a digital communication technology, including but not limited to a background, a sound, a motion, a facial expression, and clothing of a virtual streamer.

A virtual image is a virtual character model created by combining artistic capabilities with motion capture and facial capture technologies.

In current virtual live streaming, a streamer sets a virtual scene and a virtual image in advance before performing live streaming. Audience users view the same scene and image in a live streaming room. An effect of the live streaming room is relatively simple, and diversified audience requirements cannot be met. Due to a single form of current live streaming, to enrich the live streaming form, a virtual image is provided for a streamer on a live streaming platform, and motions of the virtual image and the streamer are synchronized, thereby implementing a live streaming form of an virtual image. However, in a current virtual live streaming form, both a virtual scene and a virtual image in a live streaming room are set by a streamer in advance, that is, audiences view a same live streaming room. Consequently, an effect of the live streaming room is relatively simple, and diversified requirements of users cannot be met at the same time. As a result, the live streaming room lacks attractiveness.

According to a live stream processing method in the present application, live streaming room audiences are classified based on audience attribute information of historical live streaming room audiences, and then a streamer sets different virtual scenes and virtual images based on the classification. In same virtual live streaming, the streamer may display a plurality of scenes according to a classification rule, thereby enriching live streaming content and playing methods, meeting diversified audience requirements, and improving live streaming room attractiveness.

The present application provides a live stream processing method, and the present application also relates to a live stream processing apparatus, a computing device, and a computer-readable storage medium, which are described in detail one by one in the following embodiments.

Figure 1B:
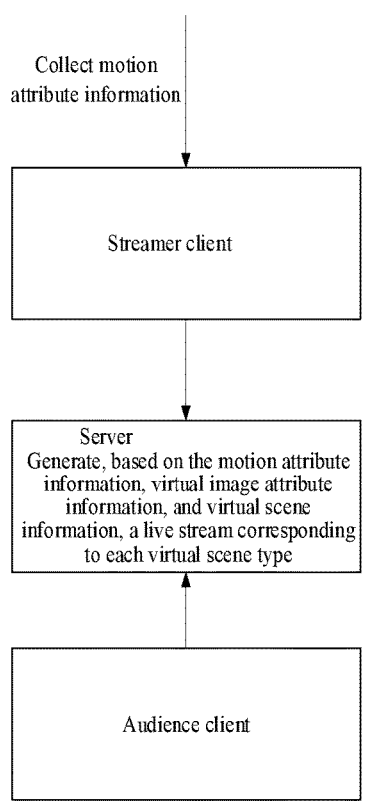
Figure 1C:
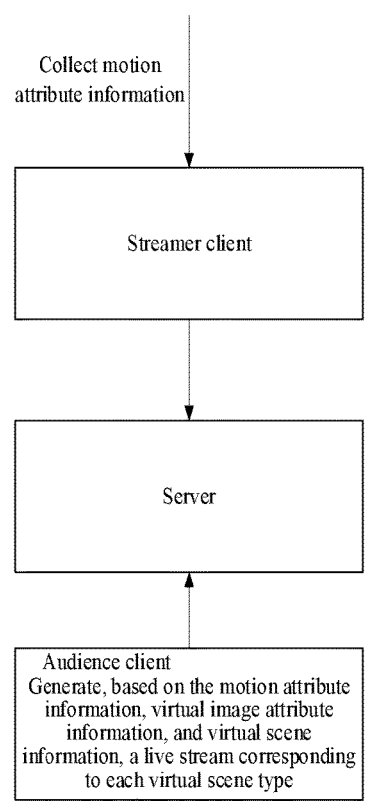

FIGS. 1a, 1b, and 1c are schematic diagrams of generating live streams according to embodiments of the present application. Currently, to enrich a live streaming form, a virtual image is provided for a live streaming room for selection by a streamer, such that the streamer can perform live streaming in the form of the virtual image, thereby improving viewing experience and attractiveness of the live streaming room. However, currently, only one virtual image selected by the streamer and a corresponding virtual scene can be viewed, resulting in a low level of personalization. Therefore, in the live stream processing method provided in the present application, motion information of the streamer is fused with different virtual images and virtual scenes, to obtain different live streams, such that different audiences can view live streaming rooms with different virtual scenes and virtual images.

Specifically, the live stream may be generated by a streamer client, and then transmitted to an audience client device by a server computing system, or may be generated by a server computing system based on live streaming information sent by a streamer client. The live stream may alternatively be generated by an audience client device when device performance of the audience client device meets a requirement.

Further, as shown in FIG. 1a, a process of generating a plurality of live streams by the streamer client device is as follows:

The streamer client device collects motion attribute information of a target streamer in a live streaming room; determines a virtual scene type set, where the virtual scene type set is used to determine a live stream corresponding to a specific virtual scene type that needs to be generated, for example, separately generate four live streams corresponding to four virtual scene types: spring, summer, autumn, and winter, respectively; determines virtual scene information and virtual image attribute information that correspond to each virtual scene type in the virtual scene type set; adjusts each piece of virtual image attribute information based on the motion attribute information, to obtain virtual image information; and determines location information of each virtual image in a corresponding virtual scene, and fuses each piece of virtual image information and the corresponding virtual scene information based on each piece of location information, to obtain a live stream corresponding to each virtual scene type. After the generated live stream is uploaded to the server computing system, a target live stream corresponding to a target virtual scene type that corresponds to the audience client device is pulled from the server computing system based on the target virtual scene type when a live streaming viewing request from the audience client device is received, and the target live stream is played on the audience client.

Further, as shown in FIG. 1B, a process of generating a plurality of live streams by the server computing system is as follows: receiving motion attribute information sent by the streamer client, and determining a virtual scene type set; determining virtual scene information and virtual image attribute information that correspond to each virtual scene type in the virtual scene type set; adjusting each piece of virtual image attribute information based on the motion attribute information, to obtain virtual image information; and determining location information of each virtual image in a corresponding virtual scene, and fusing each piece of virtual image information and the corresponding virtual scene information based on each piece of location information, to obtain a live stream corresponding to each virtual scene type. A target live stream corresponding to a target virtual scene type that corresponds to the audience client device is pulled from the server computing system based on the target virtual scene type when a live streaming viewing request from the audience client device is received, and the target live stream is played on the audience client.

Further, as shown in FIG. 1c, a process of generating a live stream by the audience client device is as follows:

sending a live streaming viewing request for a target live streaming room to the server computing system, where the live streaming viewing request includes user attribute information; determining, by the server computing system, a corresponding target virtual scene type based on the user attribute information, and returning, to the audience client, target virtual image attribute information, target virtual scene type information, and an initial live stream that correspond to the target virtual scene type; and generating, by the audience client, a live stream based on motion attribute information in the initial live stream, the target virtual image attribute information, and the target virtual scene type information, and displaying the live stream.

According to the live stream processing method in the present application, a live stream to be played that corresponds to each virtual scene type is created, and audience clients are classified. Therefore, in same virtual live streaming, a streamer can display a plurality of scenes according to the classification, thereby enriching live streaming content, meeting diversified audience requirements, and improving attractiveness of a live streaming room.

Figure 2:
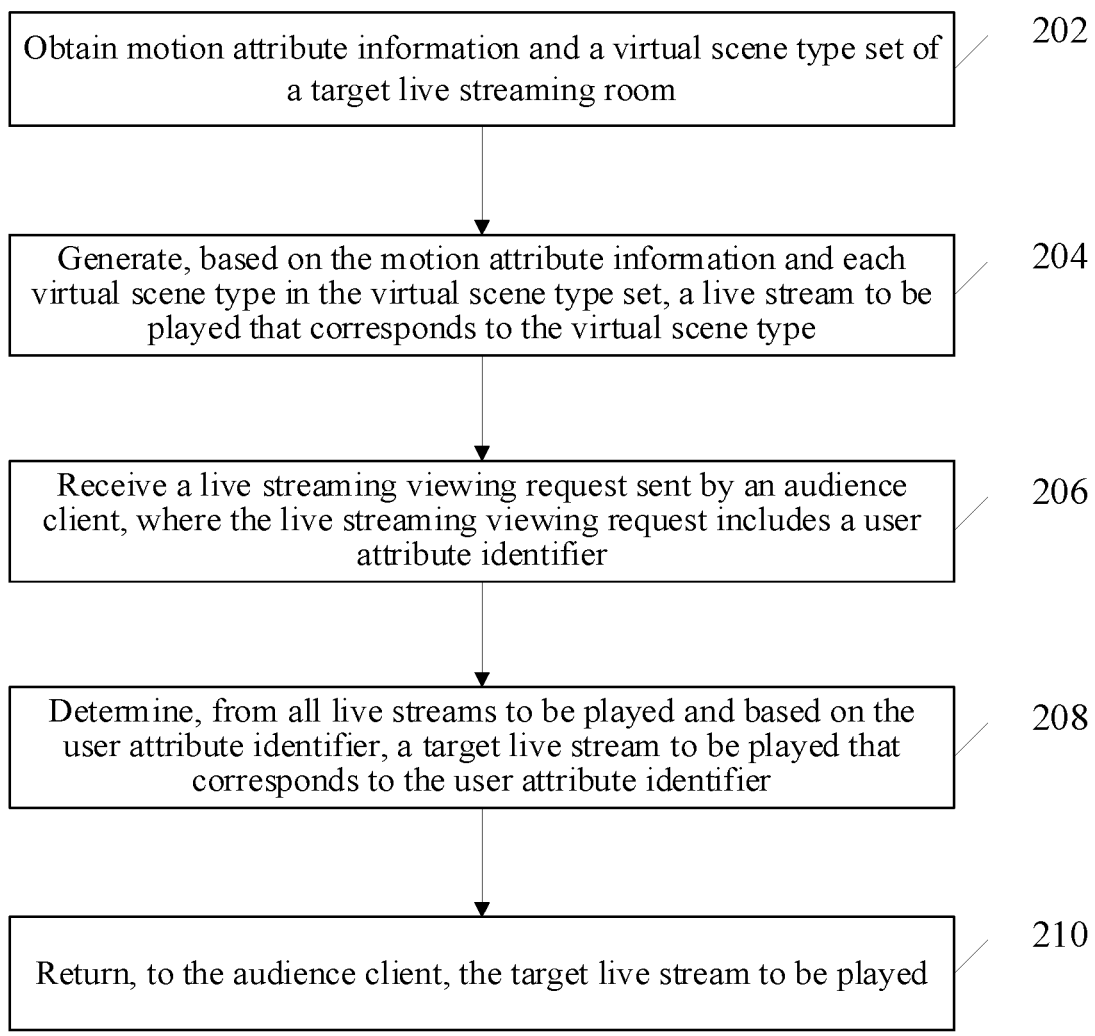
FIG. 2 is a flowchart of a live stream processing method applied to a server computing system according to an embodiment of the present application.

FIG. 2 is a flowchart of a live stream processing method applied to a server computing system according to an embodiment of the present application. The method specifically includes the following steps.

In step 202, motion attribute information and a virtual scene type set of a target live streaming room are obtained.

In actual application, a streamer client device device generates a live stream generation request for the target live streaming room based on a live streaming start operation of a streamer, and forwards the live stream generation request to a server computing system. The server computing system obtains the motion attribute information and the virtual scene type set of the target live streaming room in response to the live stream generation request. The streamer client device collects picture information generated by the streamer in the live streaming room, and sends the picture information to the server computing system, so that the server computing system can generate a live stream of the target live streaming room based on the picture information.

The target live streaming room is a live streaming room for which there is a live stream generation requirement. The live stream generation request is a request for generating the live stream corresponding to the target live streaming room. The motion attribute information is motion attribute information of a target object in the target live streaming room. The virtual scene type set is a set formed by virtual scene types. The virtual scene type is a virtual scene type set by the streamer based on live streaming information or a virtual scene type preset according to a viewing requirement. For example, the virtual scene type set includes four virtual scene types: a spring type, a summer type, an autumn type, and a winter type.

In a specific implementation of the present application, a server computing system A receives a live stream generation request that is sent by a streamer q for a live streaming room H. The server computing system obtains motion attribute information of the target live streaming room and a virtual scene type set of the target live streaming room in response to the live stream generation request.

In actual application, a method for obtaining motion attribute information of a target live streaming room may include:
obtaining motion attribute information that is sent by a streamer client device streamer client device device for the target live streaming room, where the motion attribute information is motion attribute information of a target streamer that is collected by the streamer client.

The streamer client device is a client that can collect live streaming content of the target live streaming room. The motion attribute information may be attribute information used to drive a virtual image in a live streaming room. In actual application, the motion attribute information includes body movement attribute information, facial expression information, and the like. After collecting the motion attribute information, the streamer client device sends the motion attribute information to the server computing system, so that the server computing system can create a live stream based on the motion attribute information.

Specifically, the streamer client device collects the motion attribute information of the streamer in the target live streaming room, for example, blinking three times, and raising the arm by 90 degrees, and sends the motion attribute information to the server computing system, so that the server computing system obtains the motion attribute information of the live streaming room.

In a specific implementation of the present application, after collecting the motion attribute information of the target live streaming room, the streamer client device sends the motion attribute information to the server computing system. The server computing system may directly receive the motion attribute information sent by the streamer client, where the motion attribute information is motion attribute information that is of the target streamer who performs live streaming in the target live streaming room and that is collected by the streamer client.

In addition to receiving the motion attribute information collected by the streamer client, the server computing system may alternatively obtain the motion attribute information in the following manner. Specifically, the method for obtaining motion attribute information of a target live streaming room may further include:
obtaining an initial live stream of the target live streaming room;
identifying an initial virtual image in the initial live stream; and
extracting motion attribute information corresponding to the initial virtual image.

The initial live stream is a live stream sent by the streamer client device to the server computing system, that is, a live stream generated by the streamer client device based on the motion attribute information, initial virtual image attribute information, and initial virtual scene information after collecting the motion attribute information. The initial virtual image is a virtual image existing when live streaming starts in the target live streaming room, and may be selected by a streamer, or may be set by default.

Specifically, after obtaining the initial live stream of the target live streaming room, the server computing system parses the initial live stream to determine the initial virtual image in the live stream, and extracts the motion attribute information corresponding to the initial virtual image.

In a specific implementation of the present application, the streamer client device collects the motion attribute information of the target streamer, obtains the initial live stream by performing combination based on the motion attribute information and virtual image attribute information and virtual scene information that are selected by the target streamer in the target live streaming room, and sends the initial live stream to the server computing system. The server computing system receives the initial live stream, and parses the initial live stream to obtain the motion attribute information corresponding to the virtual image.

In actual application, the method for obtaining a virtual scene type set may include:
obtaining a virtual scene type set from a database of the server computing system in response to the live stream generation request; or
parsing the live stream generation request to obtain a virtual scene type set carried in the live stream generation request.

The database is a database corresponding to the server computing system that stores a virtual scene type.

Specifically, a corresponding virtual scene type set may be directly obtained from the database of the server computing system. Alternatively, the virtual scene type set may be obtained by parsing the live stream generation request, that is, the virtual scene type set is added by the streamer client device to the live stream generation request when the streamer client device generates the request, so that the server computing system subsequently can obtain the virtual scene type set through parsing.

In actual application, when the live stream generation request does not include the virtual scene type set, in response to the live stream generation request, the database corresponding to the server computing system may be searched for a virtual scene type corresponding to the target live streaming room, to form the virtual scene type set. When the live stream generation request includes the virtual scene type set, the live stream generation request is directly parsed to obtain each virtual scene type corresponding to the target live streaming room, to form the virtual scene type set.

In a specific implementation of the present application, after receiving the live stream generation request, the server computing system parses the live stream generation request to obtain a live streaming room identifier, and searches the database corresponding to the server computing system for a corresponding virtual scene type based on the live streaming room identifier, to form the virtual scene type set.

In another specific implementation of the present application, after receiving the live stream generation request, the server computing system parses the live stream generation request to obtain a live streaming room identifier and a virtual scene type, to form, by using each virtual scene type, a virtual scene type set corresponding to the live streaming room identifier.

Further, before the obtaining motion attribute information and a virtual scene type set of a target live streaming room, a method for generating a virtual scene type may include:
    obtaining user attribute information corresponding to historical viewing users, and
    determining a preset scene configuration rule based on the user attribute information; and
    obtaining at least two virtual scene types based on the preset scene configuration rule.

The user attribute information is attribute information of historical viewing users, for example, a user IP address, an identifier of a live streaming room viewed by the user, user preference information, user level information, and user selection information. The preset scene configuration rule is a configuration rule used to generate a virtual scene type. The historical viewing user is a user who has viewed live streaming. For example, if a user 1 has viewed live streaming on a live streaming platform A, user selection information, user level information, and the like of the user A are stored as the user attribute information when the user 1 allows to obtain user attribute information thereof. The virtual scene type is at least two scene types obtained by classifying the user attribute information. For example, the historical viewing users are classified into two types based on the user preference information: northern users and southern users.

In actual application, the database of the server computing system stores the user attribute information. After receiving a virtual scene type obtaining request for the target live streaming room, the server computing system may determine the preset scene configuration rule based on the user attribute information, and generate the virtual scene type based on the preset scene configuration rule. In addition, the preset virtual scene configuration rule may alternatively be set by the streamer of the streamer client device according to a requirement, and then the virtual scene type may be generated based on the preset virtual scene configuration rule that is set by the streamer; and the determined virtual scene type set is sent to the server computing system when a live stream generation request is received. In addition, the virtual scene type may alternatively be set according to a real-time preset scene configuration rule, that is, setting of the virtual scene type is dynamic, so that real-time nature of live streaming room content may be ensured, and viewing experience of the audience may be improved.

In a specific implementation of the present application, the user preference information of the historical viewing users is obtained. The preset scene configuration rule is generated based on the user preference information, where the preset scene configuration rule is to classify users with a same season preference into a same virtual scene type. The historical viewing users are classified according to the preset scene configuration rule, to obtain four virtual scene types: spring, summer, autumn, and winter. After receiving the live stream generation request, the server computing system may obtain, based on the live streaming room identifier in the live stream generation request, the virtual scene type set stored in the database, including four virtual scene types: spring, summer, autumn, and winter.

In another specific implementation of the present application, scene configuration information for the target live streaming room is received from the streamer client, and the preset scene configuration rule is generated based on the scene configuration information, where the preset scene configuration rule is to classify users based on a gender of the viewing user. In this case, a virtual scene type 1 corresponding to a male user and a virtual scene type 2 corresponding to a female user are determined according to the preset scene configuration rule.

The preset scene configuration rule is generated by obtaining the user attribute information corresponding to the historical viewing users, or the preset scene configuration rule is set by the streamer, and the virtual scene type is further configured according to the preset scene configuration rule, so that a live stream corresponding to each virtual scene type is subsequently generated, thereby enriching live stream content.

Further, the user attribute information may include: at least one of user basic information, user viewing behavior information, and user preference information.

Specifically, the user basic information is information related to the user, for example, a user gender, a user age, and a user geographical location. The user viewing behavior information is behavior information of the user when viewing live streaming, for example, information that the user views a live streaming room, and duration of viewing a live streaming room by the user. The user preference information is preference information of the user when viewing live streaming, for example, a preference of the user for viewing event live streaming and game live streaming. In actual application, the user attribute information may be one or more pieces of information such as the user basic information, the user viewing behavior information, and the user preference information. For example, user attribute information of a historical viewing user H is user preference information and user basic information.

In actual application, after the obtaining at least two virtual scene types, the method may further include:
    generating the virtual scene type set based on the virtual scene types, and creating a preset virtual image library and a preset virtual scene library based on each virtual scene type in the virtual scene type set.

Specifically, after the server computing system determines the virtual scene type, or the streamer client device determines the virtual scene type, a virtual image and a virtual scene that correspond to the virtual scene type need to be created or obtained. After the virtual image is determined, virtual image attribute information is stored into the preset virtual image library. After the virtual scene is determined, virtual scene information is stored into the preset virtual scene library, to facilitate subsequent use of the preset virtual image library and the preset virtual scene library.

It should be noted that, the virtual image attribute information may be stored correspondingly with the virtual scene information into a database when the virtual scene and the virtual image appear only in pairs. For example, virtual scene information "winter" is stored correspondingly with virtual image attribute information "snowman" into a database corresponding to the streamer client device or the server computing system.

Virtual image attribute information and virtual scene information that correspond to each virtual scene type are obtained, so that a live stream is subsequently generated based on the virtual image attribute information and the virtual scene information that correspond to the virtual scene type.

In step 204, a live stream to be played that corresponds to each virtual scene type in the virtual scene type set is generated based on the motion attribute information and the virtual scene type.

Specifically, after the virtual scene type set and the motion attribute information are obtained, the motion attribute information corresponding to each virtual scene type in the virtual scene type set may be generated based on the virtual scene type and the motion attribute information.

In actual application, a method for generating, based on the motion attribute information and each virtual scene type in the virtual scene type set, a live stream to be played that corresponds to the virtual scene type may include:
- determining virtual image attribute information and/or virtual scene information that correspond/corresponds to each virtual scene type in the virtual scene type set; and
- generating, based on the motion attribute information and the virtual image attribute information and/or the virtual scene information that correspond/corresponds to each virtual scene type, the live stream to be played that corresponds to the virtual scene type.

The virtual image attribute information is attribute information corresponding to an initial virtual image. For example, if the streamer obtains or designs, based on a virtual scene type "winter", an initial virtual image D wearing a hat, initial motion information, hat color information, and the like of the initial virtual image D are all virtual image attribute information. The virtual scene information is information about a virtual scene corresponding to the virtual scene type. For example, if the virtual scene type is "autumn", the virtual scene information may be information corresponding to a mountain-view virtual scene with fallen leaves.

In a specific implementation of the present application, a virtual scene type set G is determined, where the virtual scene type set G includes a virtual scene type "daytime" and a virtual scene type "nighttime". Virtual image attribute information for "daytime" and virtual scene information for "daytime" are obtained based on the virtual scene type "daytime", and virtual image attribute information for "nighttime" and virtual scene information for "nighttime" are obtained based on the virtual scene type "nighttime".

In addition, virtual prop information corresponding to the virtual scene type may be further obtained, and a live stream to be played is generated based on the virtual prop information. The virtual prop information is information about a virtual object that may be displayed in a live streaming room, for example, a hat and clothing of a virtual image, an article and a building that are displayed in a virtual scene.

Further, a method for determining virtual image attribute information and/or virtual scene information that correspond/corresponds to each virtual scene type in the virtual scene type set may include:
- obtaining corresponding virtual image attribute information from a preset virtual image library based on the virtual scene type; and/or
- obtaining corresponding virtual scene information from a preset virtual scene library based on the virtual scene type.

The preset virtual image library is a database that stores virtual image attribute information, and the preset virtual scene library is a database that stores virtual scene information.

In actual application, the preset image database is searched, based on the virtual scene type, for at least two pieces of virtual image attribute information corresponding to the virtual scene type. If the preset image database does not include the virtual image attribute information, the streamer of the streamer client device needs to create or obtain corresponding virtual image attribute information based on the virtual scene type, and stores the virtual image attribute information into the preset virtual image library. After the virtual image attribute information is determined, virtual scene information corresponding to each piece of virtual image attribute information is determined from the preset virtual scene library based on the virtual image attribute information. For example, virtual scene information for "winter" is obtained based on virtual image attribute information for "winter".

It should be noted that there may be a preset correspondence between virtual image attribute information and virtual scene information, for example, virtual image attribute information of a spring type and virtual scene type information of a spring type. There may also be a correspondence that is set according to a requirement, for example, virtual scene information "blue" correspond to virtual image attribute information "green clothing".

In a specific implementation of the present application, corresponding virtual image attribute information h1 is obtained from the preset virtual image library based on a virtual scene type H, and virtual scene information h2 corresponding to the virtual image attribute information h1 is obtained from the preset virtual scene library based on the virtual image attribute information h1.

Stored virtual image attribute information and virtual scene information that correspond to each virtual scene type are obtained, or virtual image attribute information and virtual scene information that are set by the streamer and that correspond to each virtual scene type are obtained based on the virtual scene type, so that a live stream is subsequently generated.

Further, a method for generating, based on the motion attribute information and the virtual image attribute information and/or the virtual scene information that correspond/corresponds to each virtual scene type, the live stream to be played that corresponds to the virtual scene type may include:
- determining virtual image attribute information corresponding to a target virtual scene type; adjusting the virtual image attribute information based on the motion attribute information, to obtain virtual image information; and
- generating, based on the virtual image information and preset virtual scene information, a live stream to be played that corresponds to the target virtual scene type; or
- determining virtual scene information corresponding to the target virtual scene type; adjusting preset virtual image attribute information based on the motion attribute information, to obtain virtual image information; and
- generating, based on the virtual image information and the virtual scene information, a live stream to be played that corresponds to the target virtual scene type; or
- determining virtual image attribute information and virtual scene information that correspond to the target virtual scene type;
- adjusting the virtual image attribute information based on the motion attribute information, to obtain virtual image information; and
- generating, based on the virtual image information and the virtual scene information, a live stream to be played that corresponds to the target virtual scene type.

Specifically, the motion attribute information and the target virtual scene type are determined, and the target virtual scene type is any virtual scene type in the virtual scene type set. The virtual image attribute information and/or the virtual scene information that correspond/corresponds to the target virtual scene type are/is determined. If there is only virtual image attribute information corresponding to the target virtual scene type and preset virtual scene information, the virtual image attribute information is adjusted based on the motion attribute information, to obtain the virtual image information. Then, the live stream to be played that corresponds to the target virtual scene type is generated based on the virtual image information and the preset virtual scene information. The preset virtual scene information is virtual scene information preset for the target live streaming room, and the virtual scene information may be used to display different virtual images. The virtual image information is attribute information of a virtual image that is adjusted based on the motion attribute information.

In a specific implementation of the present application, if it is determined that the virtual image attribute information corresponding to the target virtual scene type is "character" and the preset virtual scene information is "stage", the virtual image attribute information "character" is adjusted based on the motion attribute information, to obtain the virtual image information. The live stream to be played that corresponds to the target virtual scene type is generated based on the virtual image information and the preset virtual scene information "stage".

Further, if the virtual scene information corresponding to the target virtual scene type and the preset virtual image attribute information are determined, the preset virtual image attribute information is adjusted based on the motion attribute information, to obtain the virtual image information, where the preset virtual image attribute information is virtual image attribute information preset for the target live streaming room, and a virtual image corresponding to the virtual image attribute information is displayed in different virtual scenes. The live stream to be played that corresponds to the target virtual scene is generated based on the virtual image information and the virtual scene information.

Further, if the virtual scene information and the virtual image attribute information that correspond to the target virtual scene are determined, the virtual image attribute information is adjusted based on the motion attribute information, to obtain the virtual image information. The live stream to be played that corresponds to the target virtual scene is generated based on the virtual image information and the virtual scene information.

Specifically, a method for adjusting the virtual image attribute information based on the motion attribute information, to obtain virtual image information may include: determining initial motion attribute information corresponding to the virtual image attribute information; and adjusting the initial motion attribute information based on the motion attribute information, to obtain the virtual image information corresponding to the target virtual scene type.

The initial motion attribute information is default motion attribute information of a target virtual image. For example, if a default motion of a virtual character B is a standing motion, initial motion attribute information of the virtual character B is information "standing".

Specifically, after the initial motion attribute information corresponding to the target virtual image attribute information is determined, the initial motion attribute information is adjusted based on the motion attribute information. For example, the initial motion "standing" is adjusted to "sitting down", to obtain the target virtual image information corresponding to the target virtual scene type.

In a specific implementation of the present application, a virtual scene type "south" is determined from the virtual scene type set, and it is determined, based on the virtual scene type "south", that corresponding virtual image attribute information is attribute information corresponding to a virtual image A. Initial motion attribute information included in the attribute information is determined, and the initial motion attribute information is adjusted based on motion attribute information, to obtain virtual image information corresponding to the current virtual information image A.

The motion attribute information is obtained, and the virtual image attribute information is converted into the virtual image information based on the motion attribute information, so that a live stream is subsequently generated based on the virtual image information and the virtual scene information.

Specifically, a method for generating, based on the virtual image information and the virtual scene information, a live stream to be played that corresponds to the target virtual scene type may include:

obtaining location information corresponding to the target virtual image information in the virtual scene information; and splicing the virtual image information and the virtual scene information based on the location information, to obtain the live stream to be played that corresponds to the target virtual scene type.

The target virtual scene information is virtual scene information corresponding to the target virtual scene type. The location information is location information of the target virtual image in the target virtual scene.

Specifically, after the target virtual image information is generated based on the motion attribute information and the target virtual image attribute information, the location information of the target virtual image in the target virtual scene is determined. The target virtual image is fused to the target location of the target virtual scene to generate the live stream to be played.

In a specific implementation of the present application, it is determined, from the virtual scene information, that the location information corresponding to the target virtual image information is as follows: Coordinates of a center point of the virtual image in the virtual scene are (45, 55, 65). In this case, the virtual image corresponding to the target virtual image information is spliced with the virtual scene corresponding to the virtual scene information based on the determined location information, to obtain the live stream to be played that corresponds to the target virtual scene.

In step 206, a live streaming viewing request sent by an audience client device is received, where the live streaming viewing request includes a user attribute identifier.

Specifically, the live streaming viewing request is a request for viewing live streaming content in the target live streaming room. The user attribute identifier is an identifier used to determine a live stream to be played that corresponds to a client. The user attribute identifier is set in the live streaming viewing request, so that after receiving the live streaming viewing request, the server computing system can determine, based on the user attribute identifier in the live streaming viewing request, a corresponding live stream to be played.

In step 208, a target live stream to be played that corresponds to the user attribute identifier is determined from all live streams to be played and based on the user attribute identifier.

Specifically, the target live stream to be played is a live stream to be played that corresponds to the user attribute identifier. After receiving the live streaming viewing request sent by the audience client, the server computing system parses the live streaming viewing request to obtain the user attribute identifier, determines, based on the user attribute identifier, a target virtual scene type corresponding to the audience client, and obtains a live stream to be played that corresponds to the target virtual scene type and uses the live stream as the target live stream to be played that needs to be pulled by the audience client.

Further, after receiving a pull request for the target live streaming room that is sent by the audience client, the server computing system obtains, from all the live streams to be played on the server computing system and based on a virtual scene type corresponding to the audience client, a live stream to be played that corresponds to the audience client, and sends the live stream to the corresponding audience client. The virtual scene type corresponding to the audience client device is determined based on user attribute information corresponding to the audience client. Audience clients corresponding to different virtual scene types display live streams to be played that correspond to different virtual scene types.

In actual application, the target live streaming room may further include a plurality of virtual image options and a plurality of virtual scene options for selection by the audience, that is, the audience client device may send, to the server computing system, a live streaming viewing request including audience selection information, where the live streaming viewing request includes the audience selection information, and the audience selection information may include virtual scene selection information and virtual image selection information. Virtual scene information to be displayed may be determined based on the virtual scene selection information, and virtual image attribute information to be displayed may be determined based on the virtual image selection information. A live stream is generated based on the motion attribute information, the virtual scene information to be displayed, and the virtual image attribute information to be displayed, so that a viewing requirement of the audience for viewing live streaming is met, and different audiences see different live streaming room pictures when viewing a same live streaming room.

In step 210, the target live stream to be played is returned to the audience client.

Specifically, after the target live stream to be played is determined, the target live stream to be played is returned to the audience client device that sends the pull request, such that the client may display the target live stream to be played.

According to the live stream processing method applied to the server computing system in the present application, the motion attribute information and the virtual scene type set of the target live streaming room are obtained; the live stream to be played that corresponds to each virtual scene type in the virtual scene type set is generated based on the motion attribute information and the virtual scene type; the live streaming viewing request sent by the audience client device is received, where the live streaming viewing request includes the user attribute identifier; the target live stream to be played that corresponds to the user attribute identifier is determined from all the live streams to be played and based on the user attribute identifier; and the target live stream to be played is returned to the audience client. The live stream to be played that corresponds to each virtual scene type is generated based on the motion attribute information and the virtual scene type set, such that different audience clients may display live streams to be played that correspond to the audience clients, thereby enriching live stream content, and improving viewing experience of users.

Figure 3:
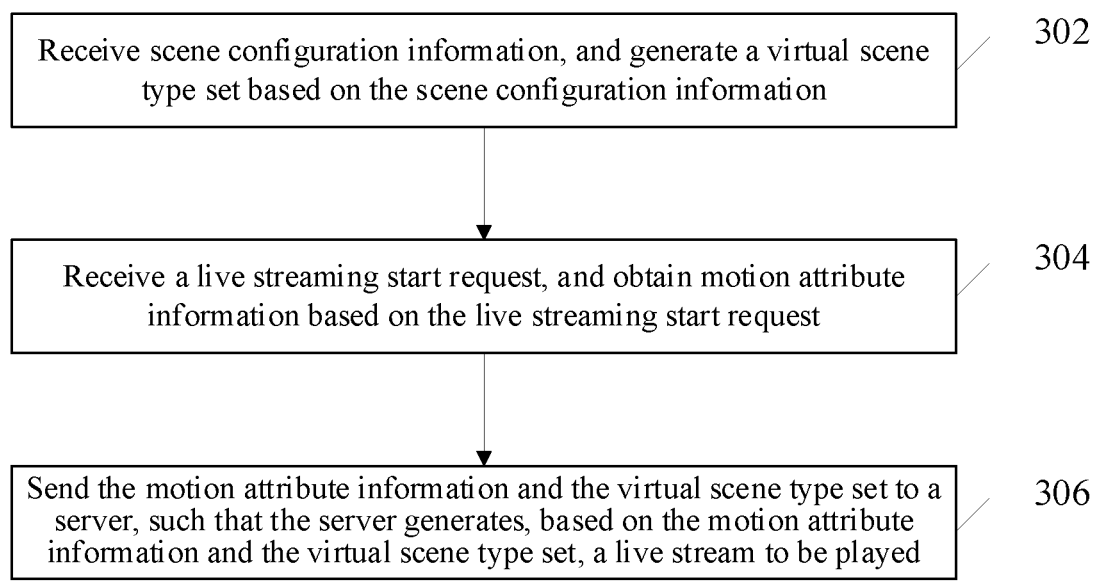
FIG. 3 is a flowchart of a live stream processing method applied to a streamer client device according to an embodiment of the present application.

FIG. 3 is a flowchart of a live stream processing method applied to a streamer client device according to an embodiment of the present application. The method specifically includes the following steps.

In step 302, scene configuration information is received, and a virtual scene type set is generated based on the scene configuration information.

The scene configuration information is configuration information used to generate a virtual scene type set. In actual application, before live streaming is started and/or during live streaming, the streamer client device may set, in real time, a preset scene configuration rule and a virtual image and a virtual scene that correspond to a virtual scene type. For example, the streamer client device may set, before live streaming is started, the preset scene configuration rule and the virtual image and the virtual scene that correspond to the virtual scene type, or may set, during live streaming based on an actual live streaming situation or requirement, the preset scene configuration rule and the virtual image and the virtual scene that correspond to the virtual scene type.

Specifically, a specific manner of receiving scene configuration information includes:

receiving virtual scene information and/or virtual image attribute information for a target live streaming room.

In actual application, the streamer client device may receive the virtual scene information and/or the virtual image attribute information for the target live streaming room. The virtual scene information and/or the virtual image attribute information may be selected by a streamer from a preset virtual scene list and a preset virtual image list, or may be preset by a live streaming platform for the target live streaming room.

After the virtual scene information and/or the virtual image attribute information are/is determined, a virtual scene type corresponding to the virtual scene information or the virtual image attribute information is determined according to the preset scene configuration rule, and the virtual scene type set is formed based on each virtual scene type.

Further, in addition to the virtual scene information and/or the virtual image attribute information, user attribute information corresponding to the virtual scene information and/or the virtual image attribute information needs to be further determined. Specifically, the method further includes:

determining user attribute identifiers for the target live streaming room, and determining user configuration information corresponding to each user attribute identifier; and determining, based on the user configuration information, a user attribute identifier corresponding to the virtual scene information and/or the virtual image attribute information.

The user configuration information is configuration information that is set for a user according to the preset scene configuration rule. Virtual scene information and/or virtual image attribute information that correspond/corresponds to the user attribute identifier may be determined based on the user configuration information. A correspondence between a user attribute identifier and virtual scene information and/or virtual image attribute information is determined, so that an audience client device can subsequently determine, based on the user attribute identifier, a live stream to be played that corresponds to a target virtual scene type.

In actual application, after the virtual scene type set is generated based on the scene configuration information, the virtual scene type set is stored on a client, or may be uploaded to a server computing system. Therefore, a method for obtaining a virtual scene type set may include:

obtaining a virtual scene type set from a database of the server computing system in response to the live stream generation request; or parsing the live stream generation request to obtain a virtual scene type set carried in the live stream generation request.

The database is a database corresponding to the server computing system that stores a virtual scene type.

Specifically, the live stream generation request may be sent to the server computing system, and the virtual scene type set corresponding to the target live streaming room that is returned by the server computing system is received. Alternatively, the virtual scene type set may be obtained by parsing the live stream generation request, that is, the virtual scene type set is created by the streamer client.

In actual application, if the streamer client device does not include the virtual scene type set, the live stream generation request needs to be sent to the server computing system, and the returned virtual scene type set needs to be received. If the streamer client device includes the virtual scene type set, subsequent processing is directly performed based on the virtual scene type set on the streamer client.

In a specific implementation of the present application, after receiving the live stream generation request sent by the streamer client, the server computing system parses the live stream generation request to obtain a live streaming room identifier, and searches the database corresponding to the server computing system for a corresponding virtual scene type based on the live streaming room identifier, to form the virtual scene type set, and return the virtual scene type set to the streamer client.

In another specific implementation of the present application, after receiving the live stream generation request, the streamer client device parses the live stream generation request to obtain a virtual scene type, that is, a virtual scene type included in the streamer client, to form, by using each virtual scene type, the virtual scene type set corresponding to the target live streaming room.

Further, before the virtual scene type set is obtained, a virtual scene type needs to be generated. Specifically, a method for generating a virtual scene type may include: obtaining user attribute information corresponding to historical viewing users; and classifying the historical viewing users based on the user attribute information, to obtain at least two virtual scene types.

The user attribute information is attribute information of the historical viewing user, for example, a user IP address, an identifier of a live streaming room viewed by the user, and user preference information. The historical viewing user is a user who has viewed live streaming. For example, if a user 1 has viewed live streaming on a live streaming platform A, an IP address, user preference information, and the like of the user A are stored as the user attribute information when the user 1 allows to obtain attribute information thereof. The virtual scene type is at least two types obtained by classifying the user attribute information. For example, the historical viewing users are classified into two types based on the user IP address: northern users and southern users.

In actual application, the database of the server computing system stores the user attribute information. After a classification request is received, the server computing system may directly classify the historical viewing users based on the user attribute information, and then return a classification result to the streamer client. Alternatively, the streamer client device may set the virtual scene type according to a requirement, to form the virtual scene type set. In addition, the virtual scene type may alternatively be set based on real-time user attribute information, that is, setting of the virtual scene type is dynamic, so that real-time nature of live streaming room content may be ensured, and viewing experience of the audience may be improved.

In a specific implementation of the present application, four virtual scene types: spring, summer, autumn, and winter, are set on the streamer client device based on a live streaming requirement of the streamer and a viewing preference of the audience, to form the virtual scene type set of the four virtual scene types. After receiving the live stream generation request, the streamer client device obtains the virtual scene type set stored in the streamer client, where the virtual scene type set includes four virtual scene types: spring, summer, autumn, and winter.

The virtual scene type set is determined, so that a live stream is subsequently generated based on the virtual scene type set.

In step 304, a live streaming start request is received, and motion attribute information is obtained based on the live streaming start request.

Specifically, the streamer may trigger a live streaming start button on the streamer client, to generate the live streaming room start request. The live streaming start request is a request for starting live streaming in the target live streaming room on the streamer client. A collection device of the streamer client device is configured in response to the live streaming start request, to obtain the motion attribute information corresponding to the target live streaming room.

In a specific implementation of the present application, the streamer client device receives the live streaming room start request, creates the target live streaming room based on the live streaming start request, and configures the collection device of the streamer client. The collection device may be a camera. The collection device of the streamer client device collects the motion attribute information corresponding to the target live streaming room.

Specifically, the streamer client device or a device connected to the streamer client device may collect motion attribute information of the streamer or another object in the target live streaming room. Alternatively, motion attribute information generated based on an input device may be collected, for example, motion attribute information generated by controlling a target object by using the input device such as a mouse or a keyboard.

In a specific implementation of the present application, the motion attribute information of the target streamer is collected by using the camera device connected to the streamer client.

In another specific implementation of the present application, the motion attribute information generated by the streamer by controlling the virtual image in the live streaming room by using the mouse is obtained.

In actual application, a method for generating, based on the motion attribute information and each piece of virtual image attribute information, virtual image information corresponding to each virtual scene type may include:

determining a target virtual scene type and target virtual image attribute information corresponding to the target virtual scene type; and generating, based on the motion attribute information and the target virtual image attribute information, target virtual image information corresponding to the target virtual scene type.

The target virtual scene type is any one of virtual scene types corresponding to the target live streaming room. The target virtual image attribute information is any one piece of virtual image attribute information corresponding to the virtual scene type. The target virtual image information is virtual image information obtained by adjusting the target virtual image attribute information based on the motion attribute information.

In a specific implementation of the present application, a virtual scene type "north" is determined from the virtual scene type set, and it is determined, based on the virtual scene type "north", that corresponding virtual image attribute information is attribute information corresponding to a virtual image A. Fusion is performed based on the obtained motion attribute information and virtual image attribute information for the virtual image A, to obtain virtual image information corresponding to the current virtual information image A.

The live streaming start request for the target live streaming room is received, and the motion attribute information of the target live streaming room is obtained in response to the live streaming start request, so that a live stream to be played is subsequently generated based on the motion attribute information of the target live streaming room.

In step 306, the motion attribute information and the virtual scene type set are sent to a server computing system, such that the server computing system generates, based on the motion attribute information and the virtual scene type set, a live stream to be played.

Specifically, the virtual scene type set generated by the streamer client device and the collected motion attribute information are sent to the server computing system. The server computing system generates, based on the virtual scene information and/or the virtual image attribute information that correspond/corresponds to the virtual scene type, a live stream to be played that corresponds to the virtual scene type.

The virtual image attribute information is attribute information corresponding to an initial virtual image. For example, if the streamer obtains or designs, based on a virtual scene type "winter", an initial virtual image D wearing a hat, initial motion information, hat color information, and the like of the initial virtual image D are all virtual image attribute information. The virtual scene information is information about a virtual scene corresponding to the virtual scene type. For example, if the virtual scene type is "autumn", the virtual scene information may be information corresponding to a mountain-view virtual scene with fallen leaves.

In a specific implementation of the present application, a virtual scene type set G is determined, where the virtual scene type set G includes a virtual scene type "daytime" and a virtual scene type "nighttime". After determining the virtual scene type set G, the server computing system obtains virtual image attribute information for "daytime" and virtual scene information for "daytime" based on the virtual scene type "daytime", and obtains virtual image attribute information for "nighttime" and virtual scene information for "nighttime" based on the virtual scene type "nighttime".

Virtual image attribute information and virtual scene information are obtained, so that a live stream is subsequently generated based on the virtual image attribute information and the virtual scene information.

In actual application, a method for determining, by the server computing system, virtual image attribute information and virtual scene information that correspond to each virtual scene type in the virtual scene type set may include:
obtaining corresponding virtual image attribute information from a preset virtual image library based on the virtual scene type; and
obtaining, from a preset virtual scene library based on each piece of virtual image attribute information, virtual scene information corresponding to the virtual image attribute information.

The preset virtual image library is a database that stores virtual image attribute information, and the preset virtual scene library is a database that stores virtual scene information. The preset virtual image library and the preset virtual scene library may be in the streamer client, or may be in the server computing system.

In actual application, the preset image database is searched, based on the virtual scene type, for at least two pieces of virtual image attribute information corresponding to the virtual scene type. If the preset image database does not include the virtual image attribute information, the streamer of the streamer client device needs to create or obtain corresponding virtual image attribute information based on the virtual scene type, and stores the virtual image attribute information into the preset virtual image library. After the virtual image attribute information is determined, virtual scene information corresponding to each piece of virtual image attribute information is determined from the preset virtual scene library based on the virtual image attribute information. For example, virtual scene information for "winter" is obtained based on virtual image attribute information for "winter".

It should be noted that there may be a preset correspondence between virtual image attribute information and virtual scene information, for example, virtual image attribute information of a spring type and virtual scene type information of a spring type. There may also be a correspondence that is set according to a requirement, for example, virtual scene information "blue" correspond to virtual image attribute information "green clothing".

In a specific implementation of the present application, corresponding virtual image attribute information h1 is obtained from the preset virtual image library based on a virtual scene type H, and virtual scene information h2 corresponding to the virtual image attribute information h1 is obtained from the preset virtual scene library based on the virtual image attribute information h1.

Stored virtual image attribute information and virtual scene information that correspond to each virtual scene type are obtained, or virtual image attribute information and virtual scene information that are set by the streamer and that correspond to each virtual scene type are obtained based on the virtual scene type, so that a live stream is subsequently generated.

To implement the above step of obtaining virtual scene information and virtual image attribute information, after the at least two virtual scene types are obtained, the method further includes:
generating the virtual scene type set based on the virtual scene types, and creating a preset virtual image library and a preset virtual scene library based on each virtual scene type in the virtual scene type set.

Specifically, after the server computing system determines the virtual scene type, or the streamer client device determines the virtual scene type, a virtual image and a virtual scene that correspond to the virtual scene type need to be created or obtained. After the virtual image is determined, virtual image attribute information is stored into the preset virtual image library. After the virtual scene is determined, virtual scene information is stored into the preset virtual scene library, to facilitate subsequent use of the preset virtual image library and the preset virtual scene library.

It should be noted that, the virtual image attribute information may be stored correspondingly with the virtual scene information into a database when the virtual scene and the virtual image appear only in pairs. For example, virtual scene information "winter" is stored correspondingly with virtual image attribute information "snowman" into a database corresponding to the streamer client device or the server computing system.

After determining the virtual scene information and/or the virtual image attribute information that correspond/corresponds to the virtual scene type, the server computing system generates, based on the motion attribute information sent by the streamer client device and the determined virtual scene information and/or virtual image attribute information, a live stream to be played that corresponds to each virtual scene type.

Further, a method for generating, based on the motion attribute information and the target virtual image attribute information, target virtual image information corresponding to the target virtual scene type may include:

determining initial motion attribute information corresponding to the target virtual image attribute information; and adjusting the initial motion attribute information based on the motion attribute information, to obtain the target virtual image information corresponding to the target virtual scene type.

The initial motion attribute information is default motion attribute information of a target virtual image. For example, if a default motion of a virtual character B is a standing motion, initial motion attribute information of the virtual character B is information "standing".

Specifically, after the initial motion attribute information corresponding to the target virtual image attribute information is determined, the initial motion attribute information is adjusted based on the motion attribute information. For example, the initial motion "standing" is adjusted to "sitting down", to obtain the target virtual image information corresponding to the target virtual scene type.

In a specific implementation of the present application, a virtual scene type "south" is determined from the virtual scene type set, and it is determined, based on the virtual scene type "south", that corresponding virtual image attribute information is attribute information corresponding to a virtual image A. Initial motion attribute information included in the attribute information is determined, and the initial motion attribute information is adjusted based on motion attribute information, to obtain virtual image information corresponding to the current virtual information image A.

The motion attribute information is collected, and the virtual image attribute information is converted into the virtual image information based on the motion attribute information, so that a live stream is subsequently generated based on the virtual image information and the virtual scene information.

Specifically, a method for generating, based on each piece of virtual image information and each piece of virtual scene information, a live stream to be played that corresponds to each virtual scene type may include:

determining target virtual image information and target virtual scene information based on the target virtual scene type;

obtaining location information corresponding to the target virtual image information in the target virtual scene information; and splicing the target virtual image information and the target virtual scene information based on the location information, to obtain the live stream to be played that corresponds to the target virtual scene type.

The target virtual scene information is virtual scene information corresponding to the target virtual scene type. The location information is location information of the target virtual image in the target virtual scene.

Specifically, after the target virtual image information is generated based on the motion attribute information and the target virtual image attribute information, the location information of the target virtual image in the target virtual scene is determined. The target virtual image is fused to the target location of the target virtual scene to generate the live stream to be played.

Further, after generating the live stream to be played that corresponds to each virtual scene type, the streamer client device sends, to the server computing system, each live stream to be played. After receiving a pull request for the target live streaming room that is sent by the audience client, the server computing system obtains, from all the live streams to be played on the server computing system and based on a virtual scene type corresponding to the audience client, a live stream to be played that corresponds to the audience client, and sends the live stream to the corresponding audience client. The virtual scene type corresponding to the audience client device is determined based on user attribute information corresponding to the audience client. Audience clients corresponding to different virtual scene types display live streams to be played that correspond to different virtual scene types.

In actual application, the target live streaming room may further include a plurality of virtual image options and a plurality of virtual scene options for selection by the audience, that is, the audience client device may send, to the server computing system, a live streaming viewing request including audience selection information, where the live streaming viewing request includes the audience selection information, and the audience selection information may include virtual scene selection information and virtual image selection information. Virtual scene information to be displayed may be determined based on the virtual scene selection information, and virtual image attribute information to be displayed may be determined based on the virtual image selection information. A live stream is generated based on the motion attribute information, the virtual scene information to be displayed, and the virtual image attribute information to be displayed, so that a viewing requirement of the audience for viewing live streaming is met, and different audiences see different live streaming room pictures when viewing a same live streaming room.

According to the live stream processing method applied to the streamer client device in the present application, the scene configuration information is received, and the virtual scene type set is generated based on the scene configuration information; the live streaming start request is received, and the motion attribute information is obtained based on the live streaming start request; and the motion attribute information and the virtual scene type set are sent to the server computing system, such that the server computing system generates, based on the motion attribute information and the virtual scene type set, the live stream to be played. The streamer client device obtains the motion attribute information of the live streaming room, generates the virtual scene type set, and sends the motion attribute information and the virtual scene type set to the server computing system, so that the server computing system may subsequently generate the live stream to be played that corresponds to each virtual scene type.

Figure 4:
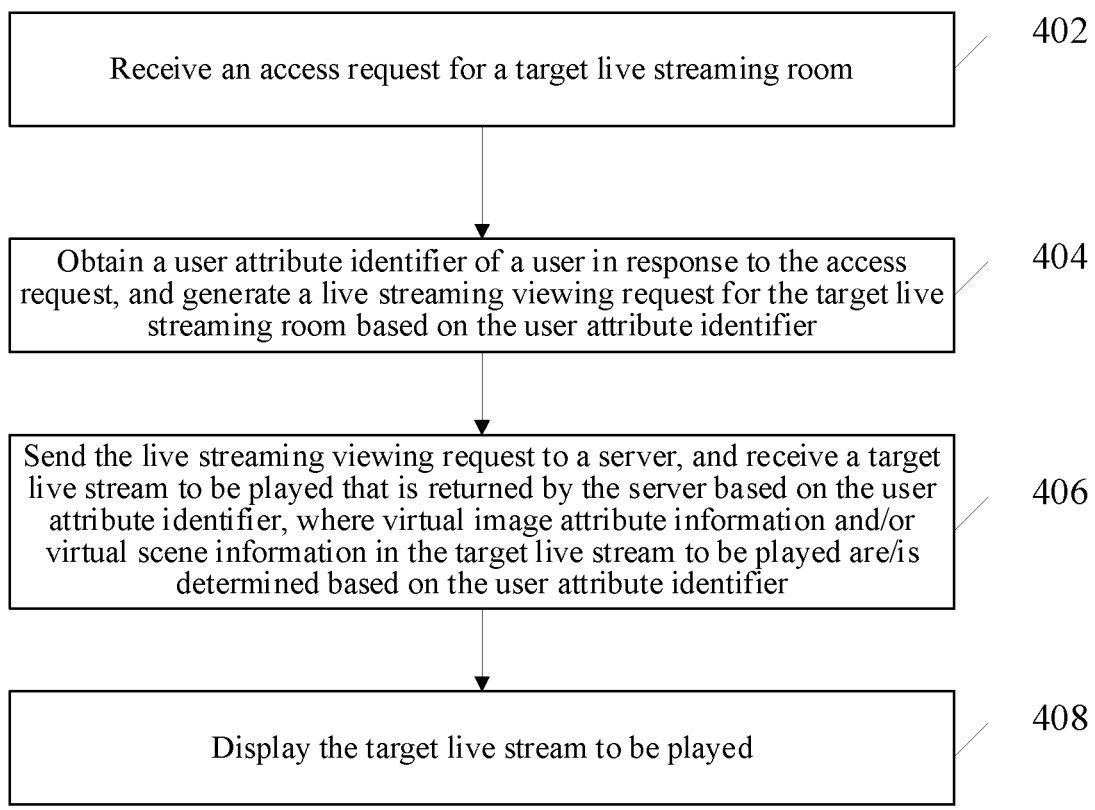
FIG. 4 is a flowchart of a live stream processing method applied to an audience client device according to an embodiment of the present application.

FIG. 4 is a flowchart of a live stream processing method applied to an audience client device according to an embodiment of the present application. The method specifically includes the following steps.

In step 402, an access request for a target live streaming room is received.

Specifically, the audience client device receives the access request of a user for the target live streaming room. For example, after entering a live streaming platform, the user selects a live streaming cover from a live streaming room list, triggers the live streaming cover, and then generates the access request for the live streaming room. The audience client device may be a terminal device such as a mobile phone or a computer that is being used by an audience.

In a specific implementation of the present application, a client A receives an access request for a music live streaming room.

The access request is received, so that a live stream corresponding to the target live streaming room is subsequently pulled based on the access request and displayed.

In step 404, a user attribute identifier of a user is obtained in response to the access request, and a live streaming viewing request for the target live streaming room is generated based on the user attribute identifier.

Specifically, in response to the access request, the audience client device determines the user attribute identifier corresponding to the audience client. The user attribute identifier is an identifier that can be used to determine a virtual scene type corresponding to the audience client. The user attribute identifier may be information included in the audience client, for example, geographical location information corresponding to the audience client device is used as the user attribute identifier. Alternatively, the user attribute identifier may be generated in advance according to a requirement, for example, the user attribute identifier is set for the audience client device based on historical preference information corresponding to the audience client, that is, information about a preference for viewing game live streaming. After the user attribute identifier corresponding to the audience client device is determined, the live streaming viewing request for the target live streaming room is generated based on the user attribute identifier.

In a specific implementation of the present application, a client A obtains a user attribute identifier in response to receiving an access request for a game live streaming room, and generates, based on the user attribute identifier, a live streaming viewing request for viewing the game live streaming room.

In step 406, the live streaming viewing request is sent to a server computing system, and a target live stream to be played that is returned by the server computing system based on the user attribute identifier is received, where virtual image attribute information and/or virtual scene information in the target live stream to be played are/is determined based on the user attribute identifier.

Specifically, the generated live streaming viewing request is sent to the server computing system corresponding to the client. After receiving the live streaming viewing request, the server computing system determines a user attribute identifier based on the live streaming viewing request; determines a virtual scene type corresponding to the user attribute identifier, and obtains, based on the determined virtual scene type, a live stream to be played, where the live stream to be played is generated by the server computing system based on virtual image attribute information and virtual scene information that correspond to the virtual scene type; and returns, to the audience client, the determined live stream to be played, such that the audience client device may display the live stream to be played.

In step 408, the target live stream to be played is displayed.

Specifically, after receiving the target live stream to be played that corresponds to the user attribute identifier, the audience client device displays the target live stream to be played.

Further, after the displaying the target live stream to be played, the method further includes:

sending a live streaming room display replacement request to the server computing system, where the live streaming room display replacement request includes virtual image replacement information and/or virtual scene replacement information;

receiving a replacement live stream returned by the server computing system based on the virtual image replacement information and/or the virtual scene replacement information; and replacing, based on the replacement live stream, the target live stream to be played for display.

The live streaming room display replacement request is a request for replacing a virtual image or a virtual scene in the target live streaming room. The live streaming room display replacement request may include virtual image attribute information of a virtual image for replacement, that is, virtual image replacement information, and information about a virtual scene for replacement, that is, virtual scene replacement information. The replacement live stream is a live stream to be played that is determined based on the virtual image replacement information and/or the virtual scene replacement information.

In actual application, the audience client device may display a virtual image list and a virtual scene list that are preset for the target live streaming room. If the user considers that a live stream to be played that is currently being played does not meet an expectation, the user may select, from the virtual image list and the virtual scene list, a virtual image or a virtual scene that meets a requirement, to replace content currently being displayed in the live streaming room.

Further, the live streaming room display replacement request may be obtained according to the following steps:

obtaining virtual image replacement information and/or virtual scene replacement information in a virtual object list; and generating the live streaming room display replacement request based on the virtual image replacement information and/or the virtual scene replacement information.

The virtual object list is one or more of a virtual image list, a virtual scene list, and a virtual prop list. From the virtual object list, the virtual image replacement information and/or the virtual scene replacement information are/is obtained, and virtual prop replacement information may also be obtained. An obtaining manner may be selected by the user on an interface of the audience client, or may be selected from the virtual object list based on a preset configuration rule. The live streaming room display replacement request is generated based on the determined virtual image replacement information and/or the determined virtual scene replacement information.

In actual application, if device performance of the audience client device meets a requirement, the audience client device may compose the live stream to be played. A specific method may be as follows:

receiving an initial live stream, target virtual image attribute information, and target virtual scene type information that are returned by the server computing system based on the user attribute identifier;

obtaining motion attribute information of a virtual image in the initial live stream, and generating target virtual image information based on the motion attribute information and the target virtual image attribute information; and generating, based on the target virtual image information and the target virtual scene information, a live stream to be played.

The initial live stream is a live stream generated based on a virtual image and a virtual scene that are selected by a streamer on the streamer client. The target virtual image attribute information is virtual image attribute information corresponding to the user attribute identifier. The target virtual scene type information is virtual scene type information corresponding to the user attribute identifier.

Specifically, after receiving the user attribute identifier, the server computing system searches for the initial live stream, the target virtual image attribute information, and the target virtual scene type information that correspond to the user attribute identifier.

In the above example, the server computing system searches for a corresponding initial live stream, corresponding target virtual image attribute information i1, and corresponding target virtual scene type information s1 based on a user attribute identifier "IP address d1", and returns the initial live stream, the target virtual image attribute information, and the target virtual scene type information to the audience client. The audience client device receives the initial live stream, the target virtual image attribute information i1, and the target virtual scene type information s1 that correspond to the user attribute identifier.

The initial live stream, the target virtual image attribute information, and the target virtual scene type information that are returned by the server computing system are received, so that a corresponding live stream to be played is subsequently generated.

Specifically, the virtual image in the initial live stream is determined, and the motion attribute information corresponding to the virtual image is extracted. Initial motion attribute information in the target virtual image attribute information is determined, and the initial motion attribute information is adjusted based on the motion attribute information, to obtain the target virtual image information.

In the above example, the initial live stream is parsed to obtain motion attribute information corresponding to a virtual image of a streamer in the initial live stream. Initial motion attribute information in the target virtual image attribute information i1 is determined, and the initial motion attribute information is adjusted based on the motion attribute information, to obtain the target virtual image information i1.

Specifically, location information of a target virtual image corresponding to the target virtual image information in the target virtual scene is determined. The target virtual image information and the target virtual scene information are fused based on the location information, to obtain the live stream to be played.

In the above example, location information corresponding to the target virtual image information i1 in the target virtual scene type information s1 is determined. The target virtual image information i1 and the target virtual scene type information s1 are spliced based on the location information, to obtain the live stream to be played that corresponds to the user attribute identifier "IP address d1".

Further, the corresponding live stream to be played is displayed when the audience client device generates the live stream to be played.

Further, the live streaming viewing request may further include audience selection information. The live streaming viewing request for the target live streaming room is sent to the server computing system, where the live streaming viewing request includes the audience selection information. An initial live stream, virtual image attribute information to be displayed, and virtual scene information to be displayed that are returned by the server computing system based on the audience selection information are received. A live stream to be played that corresponds to the user selection information is generated based on motion attribute information in the initial live stream, the virtual image attribute information to be displayed, and the virtual scene information to be displayed.

The audience selection information may include virtual scene selection information and virtual image selection information. In actual application, the audience client device displays only the live stream corresponding to the user attribute identifier, and there are a plurality of virtual image options and a plurality of virtual scene options on an interface of the audience client device of the present application for selection by the audience. The corresponding virtual image attribute information to be displayed and the corresponding virtual scene information to be displayed may be obtained from the server computing system based on the audience selection information, so that a live stream that meets the audience selection information is subsequently generated.

After receiving the live streaming start request, the streamer client device collects the motion attribute information of the streamer, and determines the virtual image and the virtual scene that are selected by the streamer; and generates the initial live stream based on the motion attribute information, the virtual image attribute information, and the virtual scene information, and sends the initial live stream to the server computing system. In addition, if the virtual scene type set, the corresponding preset virtual scene library, and the corresponding preset virtual image library are generated on the streamer client, the streamer client device also synchronizes the virtual scene type set, the corresponding preset virtual scene library, and the corresponding preset virtual image library to the server computing system. When the client sends, to the server computing system, the live streaming viewing request that includes the user attribute identifier or the audience selection information, the initial live stream, the virtual image attribute information, and the corresponding virtual scene information are obtained from the server computing system, and the live stream that may be displayed on the corresponding audience client device is generated based on the initial live stream, the virtual image attribute information, and the corresponding virtual scene information.

According to the live stream processing method applied to the audience client device in the present application, the access request for the target live streaming room is received; the user attribute identifier of the user is obtained in response to the access request, and the live streaming viewing request for the target live streaming room is generated based on the user attribute identifier; the live streaming viewing request is sent to the server computing system, and the target live stream to be played that is returned by the server computing system based on the user attribute identifier is received, where the virtual image attribute information and/or virtual scene information in the target live stream to be played are/is determined based on the user attribute identifier; and the target live stream to be played is displayed. The audience client device generates the live streaming viewing request by receiving the access request, and sends the live streaming viewing request to the server computing system, to obtain the live stream to be played that is returned by the server computing system based on the user attribute identifier, and display the live stream to be played, thereby displaying live streams corresponding to different clients, and enriching live streaming content. In addition, the audience client device may further send the replacement request to adjust a virtual scene or a virtual image in the live streaming room, thereby personalizing live streaming content.

Figure 5:
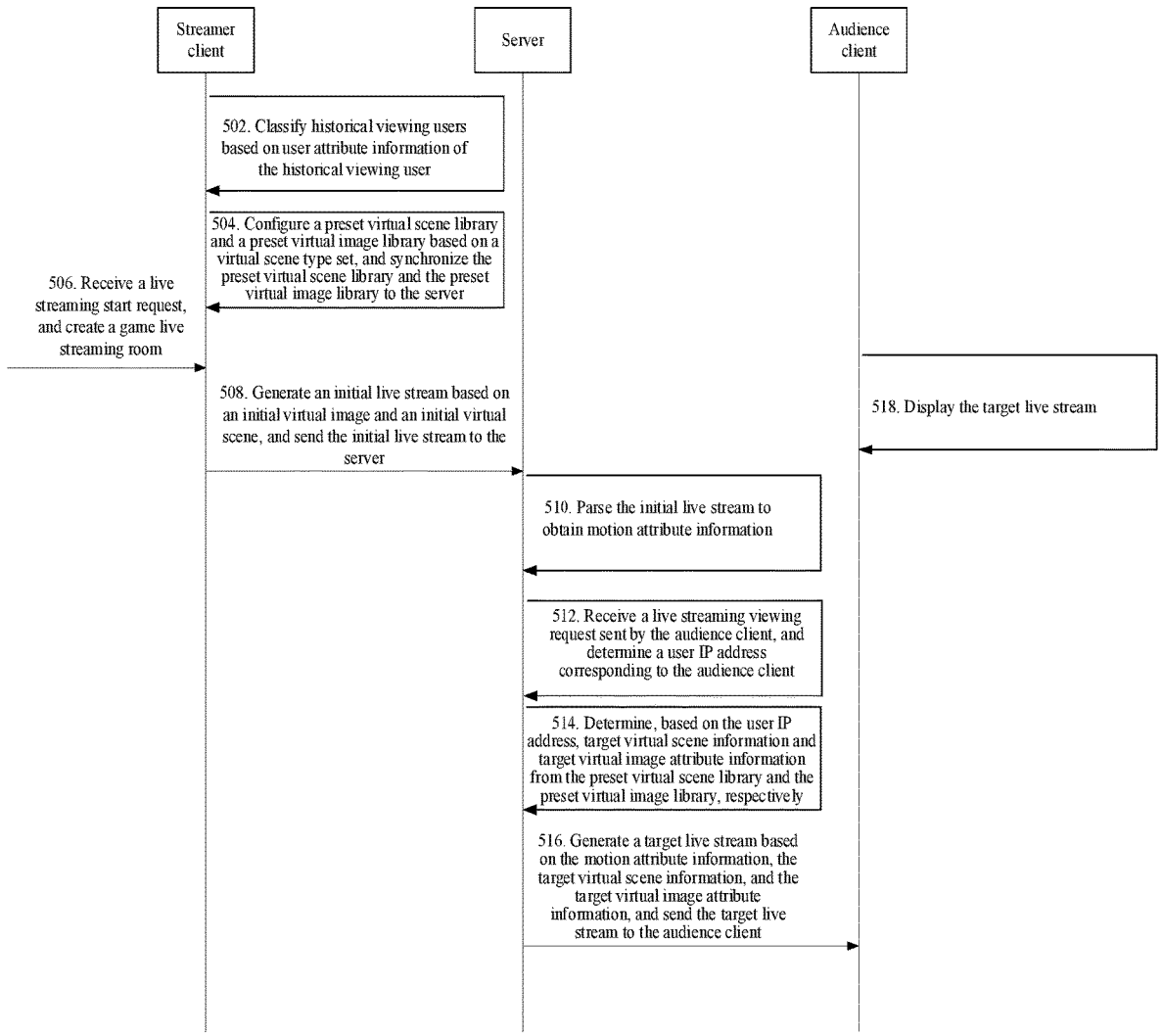
FIG. 5 is a processing flowchart of a live stream processing method applied to a game live streaming room according to an embodiment of the present application.

With reference to FIG. 5, the following further describes the live stream processing method by using an application of the live stream processing method provided in the present application in a game live streaming room as an example. FIG. 5 is a processing flowchart of a live stream processing method applied to a game live streaming room according to an embodiment of the present application. The method specifically includes the following steps.

In step 502, a streamer client device classifies historical viewing users based on user attribute information of the historical viewing user.

Figure 6:
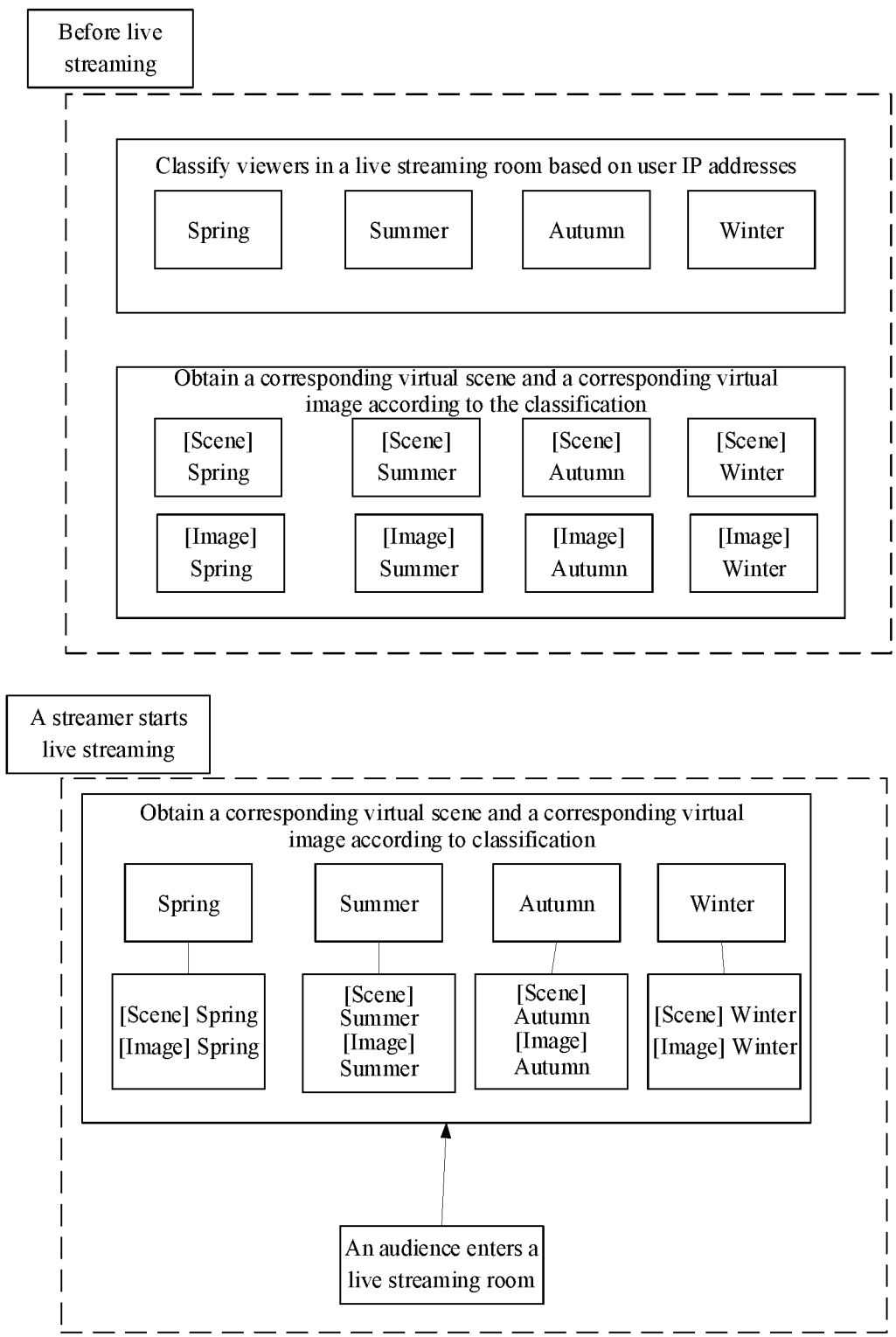
FIG. 6 is a schematic diagram of a live stream processing method according to an embodiment of the present application.

Specifically, in this embodiment, the user attribute information is a user IP address. The historical viewing users are classified into four types based on the user IP address, and are respectively four virtual scene types: spring, summer, autumn, and winter. FIG. 6 is a schematic diagram of a live stream processing method according to an embodiment of the present application.

In step 504, the streamer client device configures a preset virtual scene library and a preset virtual image library based on a virtual scene type set, and synchronizes the preset virtual scene library and the preset virtual image library to a server computing system.

Specifically, as shown in FIG. 6, corresponding virtual scene information and corresponding virtual scene attribute information are obtained based on each virtual scene type, for example, a virtual scene and a virtual image that correspond to a type "winter" are obtained.

In step 506, the streamer client device receives a live streaming start request, and creates a game live streaming room, where the live streaming start request includes an initial virtual image and an initial virtual scene.

Specifically, as shown in FIG. 6, the game live streaming room is created.

In step 508, the streamer client device generates an initial live stream based on the initial virtual image and the initial virtual scene, and sends the initial live stream to the server computing system.

In step 510, the server computing system parses the initial live stream to obtain motion attribute information.

In step 512, the server computing system receives a live streaming viewing request sent by an audience client, and determines a user IP address corresponding to the audience client.

In step 514, the server computing system determines, based on the user IP address, target virtual scene information and target virtual image attribute information from the preset virtual scene library and the preset virtual image library, respectively.

Specifically, a corresponding target virtual scene type is determined based on the user IP address, and a virtual scene and a virtual image that correspond to the target virtual scene type are collected.

In step 516, the server computing system generates a target live stream based on the motion attribute information, the target virtual scene information, and the target virtual image attribute information, and sends the target live stream to the audience client.

Specifically, as shown in FIG. 6, the server computing system generates each live stream corresponding to the game live streaming room. The audience client device pulls a corresponding live stream from the server computing system.

In step 518, the audience client device displays the target live stream.

Specifically, the audience may further switch the virtual scene and the virtual image based on a button included in the live streaming room, and display the virtual scene and the virtual image on the audience client.

According to the live stream processing method in the present application, live streaming room audiences are classified based on audience attribute information of historical live streaming room audiences, and then a streamer sets different virtual scenes and virtual images based on the classification. In same virtual live streaming, the streamer may display a plurality of scenes according to a classification rule, thereby enriching live streaming content and playing methods, meeting diversified audience requirements, and improving live streaming room attractiveness.

Figure 7:
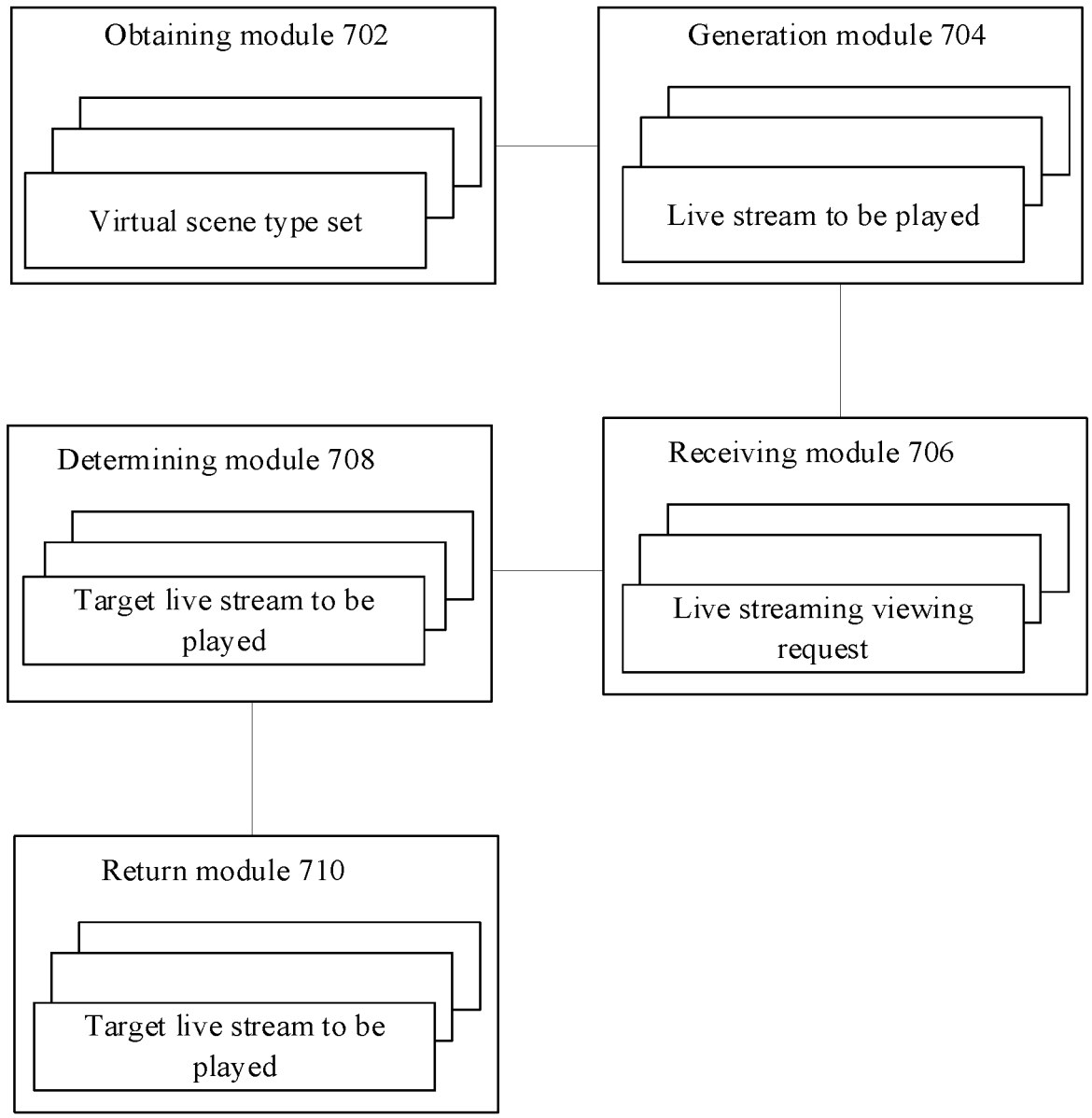
FIG. 7 is a schematic diagram of a structure of a live stream processing apparatus applied to a server computing system according to an embodiment of the present application.

Corresponding to the above method embodiment, the present application further provides an embodiment of a live stream processing apparatus. FIG. 7 is a schematic diagram of a structure of a live stream processing apparatus applied to a server computing system according to an embodiment of the present application. As shown in FIG. 7, the apparatus includes:

an obtaining module 702 configured to obtain motion attribute information and a virtual scene type set of a target live streaming room;

a generation module 704 configured to generate, based on the motion attribute information and each virtual scene type in the virtual scene type set, a live stream to be played that corresponds to the virtual scene type;

a receiving module 706 configured to receive a live streaming viewing request sent by an audience client, where the live streaming viewing request includes a user attribute identifier;

a determining module 708 configured to determine, from all live streams to be played and based on the user attribute identifier, a target live stream to be played that corresponds to the user attribute identifier; and a return module 710 configured to return, to the audience client, the target live stream to be played.

Optionally, the determining module 708 is further configured to:

determine virtual image attribute information and/or virtual scene information that correspond/corresponds to each virtual scene type in the virtual scene type set; and generate, based on the motion attribute information and the virtual image attribute information and/or the virtual scene information that correspond/corresponds to each virtual scene type, the live stream to be played that corresponds to the virtual scene type.

Optionally, the determining module 708 is further configured to:

determine virtual image attribute information corresponding to a target virtual scene type;
adjust the virtual image attribute information based on the motion attribute information, to obtain virtual image information; and
generate, based on the virtual image information and preset virtual scene information, a live stream to be played that corresponds to the target virtual scene type; or
determine virtual scene information corresponding to the target virtual scene type;
adjust preset virtual image attribute information based on the motion attribute information, to obtain virtual image information; and
generate, based on the virtual image information and the virtual scene information, a live stream to be played that corresponds to the target virtual scene type; or
determine virtual image attribute information and virtual scene information that correspond to the target virtual scene type;
adjust the virtual image attribute information based on the motion attribute information, to obtain virtual image information; and
generate, based on the virtual image information and the virtual scene information, a live stream to be played that corresponds to the target virtual scene type.

Optionally, the determining module 708 is further configured to:
obtain corresponding virtual image attribute information from a preset virtual image library based on the virtual scene type; and/or
obtain corresponding virtual scene information from a preset virtual scene library based on the virtual scene type.

Optionally, the obtaining module 702 is further configured to:
obtain user attribute information corresponding to historical viewing users, and determining a preset scene configuration rule based on the user attribute information; and
obtain at least two virtual scene types based on the preset scene configuration rule.

Optionally, the user attribute information includes: at least one of user basic information, user viewing behavior information, and user preference information.

Optionally, the apparatus further includes a creation module, configured to:
generate the virtual scene type set based on the virtual scene types, and creating a preset virtual image library and a preset virtual scene library based on each virtual scene type in the virtual scene type set.

Optionally, the obtaining module 702 is further configured to:
obtain motion attribute information that is sent by a streamer client device for the target live streaming room, where the motion attribute information is motion attribute information of a target streamer that is collected by the streamer client.

Optionally, the obtaining module 702 is further configured to:
obtain an initial live stream of the target live streaming room;
identify an initial virtual image in the initial live stream; and extract motion attribute information corresponding to the initial virtual image.

Optionally, the determining module 708 is further configured to:

determine initial motion attribute information corresponding to the virtual image attribute information; and
adjust the initial motion attribute information based on the motion attribute information, to
obtain the virtual image information corresponding to the target virtual scene type.

Optionally, the determining module 708 is further configured to:
obtain location information corresponding to the target virtual image information in the virtual scene information; and
splice the virtual image information and the virtual scene information based on the location information, to obtain the live stream to be played that corresponds to the target virtual scene type.

According to the live stream processing method applied to the server computing system in the present application, the obtaining module obtains the motion attribute information and the virtual scene type set of the target live streaming room; the generation module generates, based on the motion attribute information and each virtual scene type in the virtual scene type set, the live stream to be played that corresponds to the virtual scene type; the receiving module receives the live streaming viewing request sent by the audience client, where the live streaming viewing request includes the user attribute identifier; the determining module determines, from all live streams to be played and based on the user attribute identifier, the target live stream to be played that corresponds to the user attribute identifier; and the return module returns, to the audience client, the target live stream to be played. The live stream to be played that corresponds to each virtual scene type is generated based on the motion attribute information and the virtual scene type set, such that different audience clients may display live streams to be played that correspond to the audience clients, thereby enriching live stream content, and improving viewing experience of users.

Figure 8:
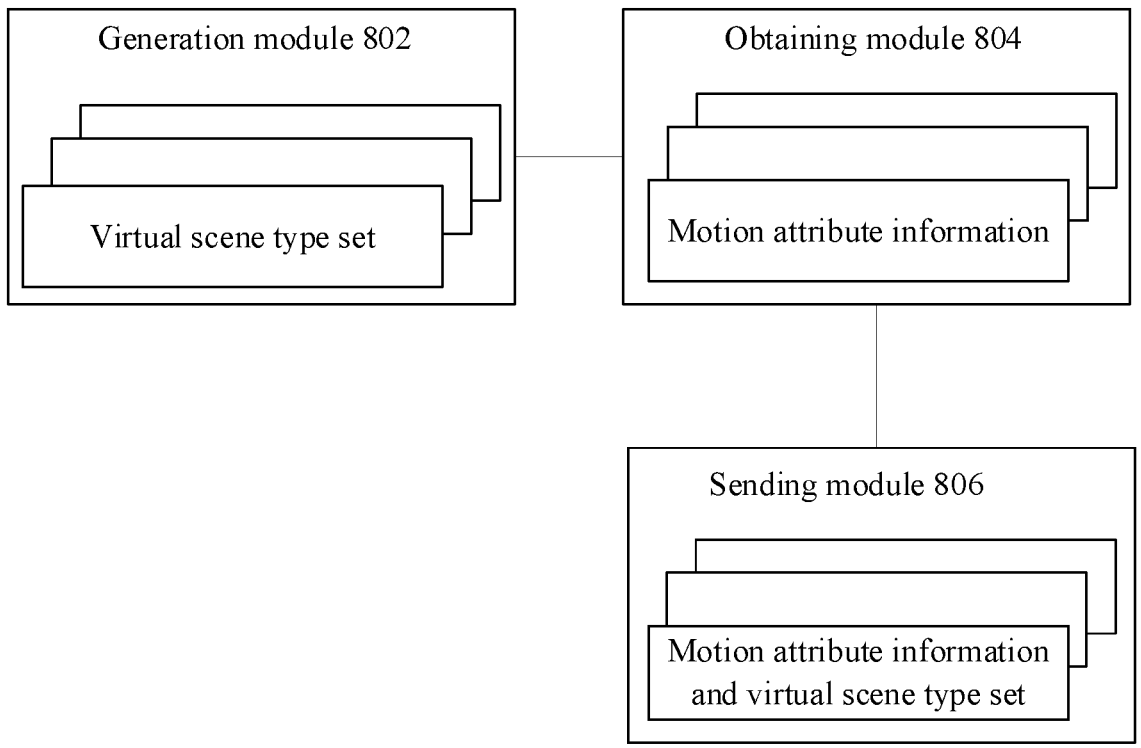
FIG. 8 is a schematic diagram of a structure of a live stream processing apparatus applied to a streamer client device according to an embodiment of the present application.

Corresponding to the above method embodiment, the present application further provides an embodiment of a live stream processing apparatus. FIG. 8 is a schematic diagram of a structure of an apparatus applied to a streamer client device according to an embodiment of the present application. As shown in FIG. 8, the apparatus includes:
a generation module 802 configured to receive scene configuration information, and generate a virtual scene type set based on the scene configuration information;
an obtaining module 804 configured to receive a live streaming start request, and obtain motion attribute information based on the live streaming start request; and
a sending module 806 configured to send the motion attribute information and the virtual scene type set to a server computing system, such that the server computing system generates, based on the motion attribute information and the virtual scene type set, a live stream to be played.

Optionally, the generation module 802 is further configured to:
receive virtual scene information and/or virtual image attribute information for a target live streaming room.

Optionally, the apparatus further includes a determining sub-module, configured to:
determine user attribute identifiers for the target live streaming room, and determining user configuration information corresponding to each user attribute identifier; and determine, based on the user configuration information, a user attribute identifier corresponding to the virtual scene information and/or the virtual image attribute information.

According to the live stream processing method applied to the streamer client device in the present application, the generation module receives the scene configuration information, and generates the virtual scene type set based on the scene configuration information; the obtaining module receives the live streaming start request, and obtains the motion attribute information based on the live streaming start request; and the sending module sends the motion attribute information and the virtual scene type set to the server computing system, such that the server computing system generates, based on the motion attribute information and the virtual scene type set, the live stream to be played. The motion attribute information of the target live streaming room is obtained, the virtual scene type set is generated, and the motion attribute information and the virtual scene type set are sent to the server computing system, so that the server computing system may subsequently generate the live stream to be played that corresponds to each virtual scene type.

Figure 9:
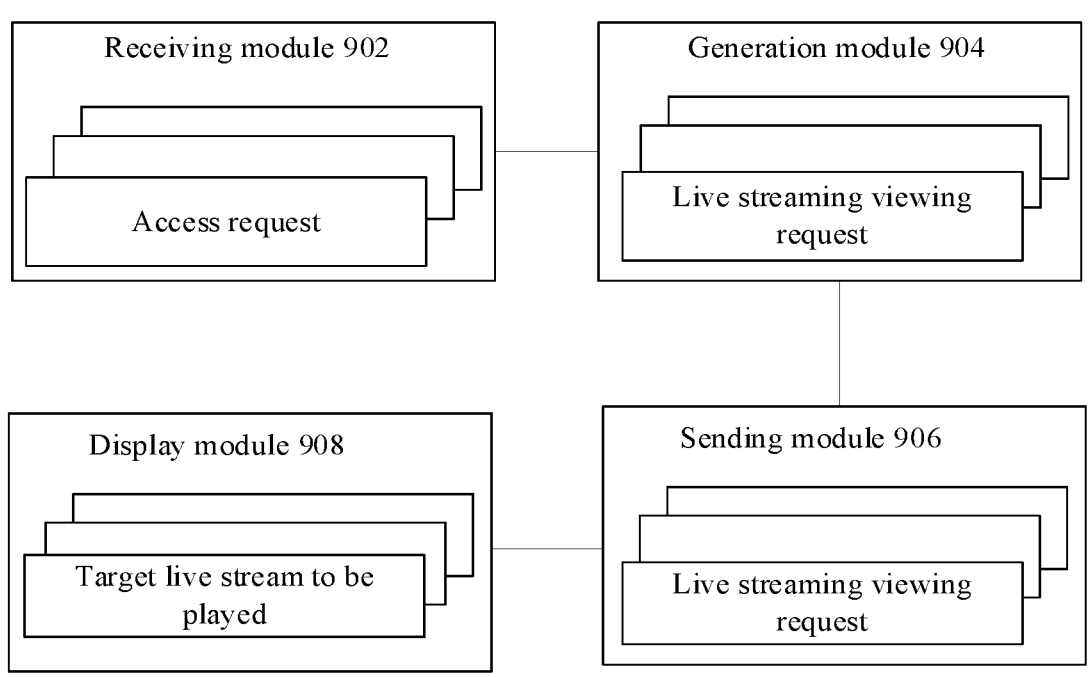
FIG. 9 is a schematic diagram of a structure of a live stream processing apparatus applied to an audience client device according to an embodiment of the present application.

Corresponding to the above method embodiment, the present application further provides an embodiment of a live stream processing apparatus. FIG. 9 is a schematic diagram of a structure of a live stream processing apparatus applied to an audience client device according to an embodiment of the present application. As shown in FIG. 9, the apparatus includes:

a receiving module 902 configured to receive an access request for a target live streaming room;

a generation module 904 configured to obtain a user attribute identifier of a user in response to the access request, and generate a live streaming viewing request for the target live streaming room based on the user attribute identifier;

a sending module 906 configured to send the live streaming viewing request to a server computing system, and receive a target live stream to be played that is returned by the server computing system based on the user attribute identifier, where virtual image attribute information and/or virtual scene information in the target live stream to be played are/is determined based on the user attribute identifier; and a display module 908 configured to display the target live stream to be played.

Optionally, the apparatus further includes a display sub-module, configured to:

send a live streaming room display replacement request to the server computing system, where the live streaming room display replacement request includes virtual image replacement information and/or virtual scene replacement information;

receive a replacement live stream returned by the server computing system based on the virtual image replacement information and/or the virtual scene replacement information; and replace, based on the replacement live stream, the target live stream to be played for display.

Optionally, the live streaming room display replacement request is obtained according to the following steps:

obtaining virtual image replacement information and/or virtual scene replacement information in a virtual object list; and generating the live streaming room display replacement request based on the virtual image replacement information and/or the virtual scene replacement information.

According to the live stream processing method applied to the audience client device in the present application, the receiving module receives the access request for the target live streaming room; the generation module obtains the user attribute identifier of the user in response to the access request, and generates the live streaming viewing request for the target live streaming room based on the user attribute identifier; the sending module sends the live streaming viewing request to the server computing system, and receives the target live stream to be played that is returned by the server computing system based on the user attribute identifier, where the virtual image attribute information and/or the virtual scene information in the target live stream to be played are/is determined based on the user attribute identifier; and the display module displays the target live stream to be played. The live streaming viewing request is generated by receiving the access request, and the live streaming viewing request is sent to the server computing system, to obtain the live stream to be played that is returned by the server computing system based on the user attribute identifier, and display the live stream to be played, thereby displaying live streams corresponding to different clients, and enriching live streaming content.

The above description is a schematic solution of the live stream processing apparatus of this embodiment. It should be noted that the technical solution of the live stream processing apparatus belongs to the same concept as the technical solution of the above live stream processing method. For details that are not described in the technical solution of the live stream processing apparatus, references may be made to the description of the technical solution of the above live stream processing method.

Figure 10:
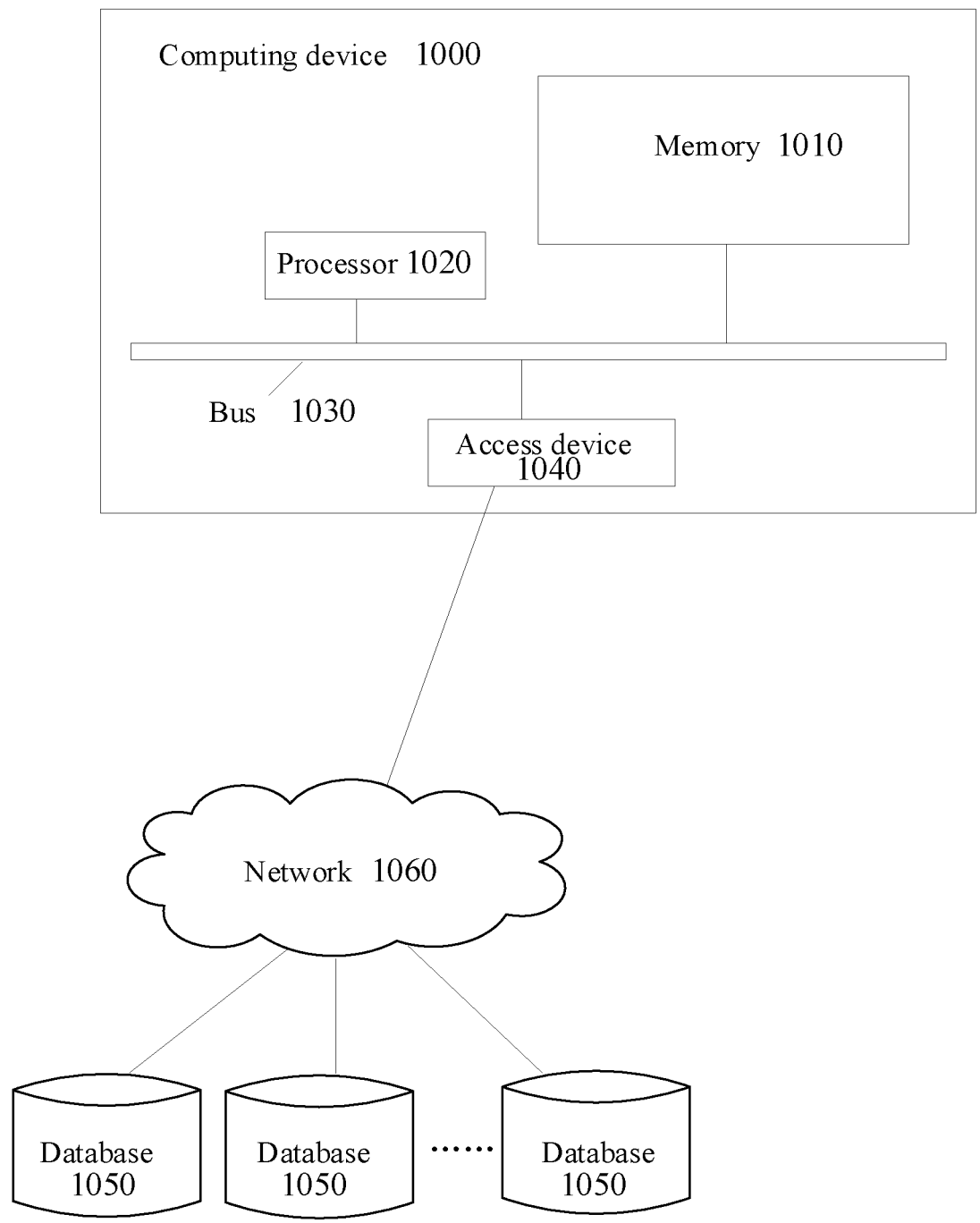
FIG. 10 is a block diagram of a structure of a computing device according to an embodiment of the present application.

FIG. 10 is a block diagram of a structure of a computing device 1000 according to an embodiment of the present application. Components of the computing device 1000 include, but are not limited to, a memory 1010 and a processor 1020. The processor 1020 is connected to the memory 1010 through a bus 1030, and a database 1050 is configured to store data.

The computing device 1000 further includes an access device 1040. The access device 1040 enables communication of the computing device 1000 via one or more networks 1060. Examples of the networks include a public switched telephone network (PSTN), a local area network (LAN), a wide area network (WAN), a personal area network (PAN), or a combination of communication networks such as the Internet. The access device 1040 may include one or more of any types of wired or wireless network interface (for example, a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near-field communication (NFC) interface.

In an embodiment of the present application, the above components of the computing device 1000 and other components not shown in FIG. 10 may be alternatively connected to each other, for example, through a bus. It should be understood that the block diagram of the structure of the computing device shown in FIG. 10 is merely an example, instead of limiting the scope of the present application. Those skilled in the art can add or replace other components as required.

The computing device 1000 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a still computing device, for example, a desktop computer or a PC. The computing device 1000 may alternatively be a mobile or stationary server computing system.

When the processor 1020 executes the computer instructions, the steps of the live stream processing method are implemented.

The above description is a schematic solution of the computing device of this embodiment. It should be noted that the technical solution of the computing device belongs to the same concept as the technical solution of the foregoing live stream processing method. For details that are not described in the technical solution of the computing device, references may be made to the description of the technical solution of the above live stream processing method.

An embodiment of the present application further provides a computer-readable storage medium storing computer instructions, where the computer instructions, when executed by a processor, implement the steps of the live stream processing method described above.

The above description is a schematic solution of the computer-readable storage medium of this embodiment. It should be noted that the technical solution of the storage medium belongs to the same concept as the technical solution of the foregoing live stream processing method. For details that are not described in the technical solution of the storage medium, references may be made to the description of the technical solution of the above live stream processing method.

Specific embodiments of the present application are described above. Other embodiments are within the scope of the appended claims. In some cases, the actions or steps recited in the claims can be performed in an order different from that in the embodiments, and can still achieve desired results. In addition, the processes depicted in the figures are not necessarily required to be shown in a particular or sequential order, to achieve desired results. In some implementations, multi-task processing and parallel processing are also possible or may be advantageous.

The computer instructions include computer program code, which may be in a source code form, an object code form, an executable file form, some intermediate forms, etc. The computer-readable medium may include: any entity or apparatus that can carry the computer program code, such as a recording medium, a USB flash drive, a removable hard disk, a magnetic disk, an optical disc, a computer memory, a read-only memory (ROM), a random access memory (RAM), an electrical carrier signal, a telecommunications signal, and a software distribution medium. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

It should be noted that, for ease of description, the foregoing method embodiments are described as a series of action combinations. However, persons skilled in the art should understand that the present application is not limited to the described action order, because according to the present application, some steps may be performed in another order or simultaneously. Moreover, those skilled in the art should also understand that the embodiments described in this specification are all preferred embodiments, and the involved actions and modules are not necessarily required by the present application.

In the above embodiments, the embodiments are described with different emphases, and for a part which is not detailed in an embodiment, references can be made to the related description of the other embodiments.

The preferred embodiments of the present application disclosed above are merely provided to help illustrate the present application. Optional embodiments are not intended to exhaust all details, nor do they limit the invention to only the described specific implementations. Apparently, many modifications and variations may be made in light of the content of the present application. In the present application, these embodiments are selected and specifically described to provide a better explanation of the principles and practical applications of the present application, so that those skilled in the art can well understand and utilize the present application. The present application should be defined only by the claims, and the full scope and equivalents thereof.

What is claimed is:

1. A method of generating live streams, applied to a server computing system, comprising:
   obtaining motion attribute information and a set of virtual scene types associated with a target live streaming room;
   generating, based on the motion attribute information and each of the set of virtual scene types, a plurality of live streams to be played that correspond to the set of virtual scene types;
   receiving a live stream viewing request sent from an audience client device, where the live stream viewing request comprises a user attribute identifier of a user associated with the audience client device;
   determining a target live stream among the plurality of live streams to be played based on the user attribute identifier; and
   returning, to the audience client device, the target live stream for display on the audience client device,
   wherein the generating, based on the motion attribute information and each of the set of virtual scene types, a plurality of live streams to be played that correspond to the set of virtual scene types comprises:
   determining at least one of virtual image attribute information or virtual scene information corresponding to each of the set of virtual scene types, and
   generating, based on the motion attribute information and the at least one of the virtual image attribute information or the virtual scene information, the plurality of live streams to be played that correspond to the set of virtual scene types, wherein the generating, based on the motion attribute information and the at least one of the virtual image attribute information or the virtual scene information, the plurality of live streams to be played that correspond to the set of virtual scene types comprises:
   determining virtual image attribute information corresponding to a target virtual scene type among the set of virtual scene types, generating virtual image information by adjusting the virtual image attribute information based on the motion attribute information, and generating a live stream to be played that corresponds to the target virtual scene type based on the virtual image information and preset virtual scene information, or determining virtual scene information corresponding to a target virtual scene type among the set of virtual scene types, generating virtual image information by adjusting preset virtual image attribute information based on the motion attribute information, and generating a live stream to be played that corresponds to the target virtual scene type based on the virtual image information and the virtual scene information, or determining virtual image attribute information and virtual scene information that correspond to a target virtual scene type among the set of virtual scene types, generating virtual image information by adjusting the virtual image attribute information based on the motion attribute information, and generating a live stream to be played that corresponds to the target virtual scene type based on the virtual image information and the virtual scene information.

2. The method according to claim 1, wherein the determining at least one of virtual image attribute information or virtual scene information corresponding to each of the set of virtual scene types comprises at least one of:

obtaining corresponding virtual image attribute information from a preset virtual image library based on each of the set of virtual scene types; or obtaining corresponding virtual scene information from a preset virtual scene library based on each of the set of virtual scene types.

3. The method according to claim 1, wherein before the obtaining motion attribute information and a set of virtual scene types associated with a target live streaming room, the method further comprises:

obtaining historical user attribute information corresponding to historical viewing users, and determining a preset scene configuration rule based on the historical user attribute information; and creating at least two virtual scene types based on the preset scene configuration rule.

4. The method according to claim 3, wherein the historical user attribute information comprises at least one of user basic information, user viewing behavior information, or user preference information corresponding to the historical viewing users.

5. The method according to claim 3, wherein after the acquiring at least two virtual scene types, the method further comprises:

creating a preset virtual image library and a preset virtual scene library based on each of the set of virtual scene type comprising the at least two virtual scene types.

6. The method according to claim 1, wherein obtaining the motion attribute information associated with a target live streaming room comprises:

obtaining the motion attribute information that is sent from a streamer client device for the target live streaming room, wherein the motion attribute information is motion attribute information of a target streamer that is collected by the streamer client device.

7. The method according to claim 1, wherein obtaining the motion attribute information associated with a target live streaming room comprises:

obtaining an initial live stream of the target live streaming room;

identifying an initial virtual image in the initial live stream; and extracting the motion attribute information corresponding to the initial virtual image.

8. The method according to claim 1, wherein the generating virtual image information by adjusting the virtual image attribute information based on the motion attribute information comprises:

determining initial motion attribute information corresponding to the virtual image attribute information; and generating the virtual image information corresponding to the target virtual scene type by adjusting the initial motion attribute information based on the motion attribute information.

9. The method according to claim 1, wherein the generating a live stream to be played that corresponds to the target virtual scene type based on the virtual image information and the virtual scene information comprises:

obtaining location information corresponding to target virtual image information in the virtual scene information; and generating the live stream by splicing the virtual image information and the virtual scene information based on the location information.

10. A method of generating live streams, applied to a streamer client device, comprising:

receiving scene configuration information;

generating a set of virtual scene types based on the scene configuration information;

receiving a request for starting live streaming;

collecting motion attribute information in response to receiving the request for starting live streaming;

generating a plurality of live streams corresponding to the set of virtual scene types based on the motion attribute information and the set of virtual scene types, wherein the plurality of live streams correspond to a plurality of classifications of viewers; and uploading the plurality of live streams to the server computing system of claim 1 for distribution.

11. The method according to claim 10, wherein the receiving scene configuration information comprises:

receiving at least one of virtual scene information or virtual image attribute information for a target live streaming room.

12. The method according to claim 1, wherein the audience client device is configured to implement operations, the operations comprising:

receiving a request for accessing a target live streaming room;

obtaining a user attribute identifier of a user associated with the audience client device in response to receiving the request for accessing the target live streaming room;

generating a live stream viewing request for the target live streaming room based on the user attribute identifier;

sending the live stream viewing request to a server computing system, wherein the live stream viewing request comprises information indicative of the user attribute identifier, and wherein the server computing system determines a target virtual scene type among a set of virtual scene types based on the user attribute identifier;

receiving target virtual image information, target virtual scene information, and an initial live stream corresponding to the target virtual scene type from the server computing system;

generating the live stream based on the target virtual image information, the target virtual scene information, and motion attribute information extracted from the initial live stream; and displaying the live stream on the audience client device.

13. The method according to claim 12, wherein after the displaying the live stream, the method further comprises:

sending a request for replacing at least one of the target virtual image information or the target virtual scene information to the server computing device; and receiving a replacement live stream from the server computing system based on the request for replacing at least one of the target virtual image information or the target virtual scene information.

14. The method according to claim 13, wherein the request for replacing at least one of the target virtual image information or the target virtual scene information is generated by:

obtaining at least one of replacement virtual image information or replacement virtual scene information in a virtual object list; and generating the request for replacing at least one of the target virtual image information or the target virtual scene information based on the at least one of the replacement virtual image information or the replacement virtual scene information.

15. A server computing system of generating live streams, comprising:

at least one processor; and at least one memory communicatively coupled to the at least one processor and comprising computer-readable instructions that upon execution by the at least one processor cause the at least one processor to perform operations comprising:

obtaining motion attribute information and a set of virtual scene types associated with a target live streaming room;

generating, based on the motion attribute information and each of the set of virtual scene types, a plurality of live streams to be played that correspond to the set of virtual scene types;

receiving a live stream viewing request sent from an audience client device, where the live stream viewing request comprises a user attribute identifier of a user associated with the audience client device;

determining a target live stream among the plurality of live streams to be played based on the user attribute identifier; and returning, to the audience client device, the target live stream for display on the audience client device, wherein the generating, based on the motion attribute information and each of the set of virtual scene types, a plurality of live streams to be played that correspond to the set of virtual scene types comprises:

determining at least one of virtual image attribute information or virtual scene information corresponding to each of the set of virtual scene types, and generating, based on the motion attribute information and the at least one of the virtual image attribute information or the virtual scene information, the plurality of live streams to be played that correspond to the set of virtual scene types, wherein the generating, based on the motion attribute information and the at least one of the virtual image attribute information or the virtual scene information, the plurality of live streams to be played that correspond to the set of virtual scene types comprises:

determining virtual image attribute information corresponding to a target virtual scene type among the set of virtual scene types, generating virtual image information by adjusting the virtual image attribute information based on the motion attribute information, and generating a live stream to be played that corresponds to the target virtual scene type based on the virtual image information and preset virtual scene information, or determining virtual scene information corresponding to a target virtual scene type among the set of virtual scene types, generating virtual image information by adjusting preset virtual image attribute information based on the motion attribute information, and generating a live stream to be played that corresponds to the target virtual scene type based on the virtual image information and the virtual scene information, or determining virtual image attribute information and virtual scene information that correspond to a target virtual scene type among the set of virtual scene types, generating virtual image information by adjusting the virtual image attribute information based on the motion attribute information, and generating a live stream to be played that corresponds to the target virtual scene type based on the virtual image information and the virtual scene information.

16. The server computing system according to claim 15, wherein before the obtaining motion attribute information and a set of virtual scene types associated with a target live streaming room, the method further comprises:

obtaining historical user attribute information corresponding to historical viewing users, and determining a preset scene configuration rule based on the historical user attribute information; and creating at least two virtual scene types based on the preset scene configuration rule.

17. The server computing system according to claim 15, wherein obtaining the motion attribute information associated with a target live streaming room comprises:

obtaining the motion attribute information that is sent from a streamer client device for the target live streaming room, wherein the motion attribute information is motion attribute information of a target streamer that is collected by the streamer client device.

* * * * *